(12) United States Patent
Tarumi

(10) Patent No.: US 8,327,262 B2
(45) Date of Patent: Dec. 4, 2012

(54) LAYOUT EDITING APPARATUS AND LAYOUT EDITING METHOD

(75) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 12/614,644

(22) Filed: Nov. 9, 2009

(65) Prior Publication Data

US 2010/0122158 A1   May 13, 2010

(30) Foreign Application Priority Data

Nov. 13, 2008   (JP) ................ 2008-291501

(51) Int. Cl.
*G06F 17/00*   (2006.01)
(52) U.S. Cl. ......... 715/246; 715/243; 715/273; 715/274
(58) Field of Classification Search .......... 715/243, 715/246, 273, 274, 244
See application file for complete search history.

(56) References Cited

U.S. PATENT DOCUMENTS

| | | | | |
|---|---|---|---|---|
| 5,845,303 | A * | 12/1998 | Templeman | 715/255 |
| 6,826,727 | B1 * | 11/2004 | Mohr et al. | 715/235 |
| 7,325,196 | B1 * | 1/2008 | Covington et al. | 715/251 |
| 7,325,197 | B1 * | 1/2008 | Massena et al. | 715/251 |
| 7,380,202 | B1 * | 5/2008 | Lindhorst et al. | 715/204 |
| 7,383,499 | B2 * | 6/2008 | Kraft et al. | 715/246 |
| 7,409,635 | B2 * | 8/2008 | Epstein | 715/243 |
| 7,454,699 | B2 * | 11/2008 | Altman et al. | 715/255 |
| 7,640,516 | B2 * | 12/2009 | Atkins | 715/853 |

FOREIGN PATENT DOCUMENTS

JP   2000-48216   2/2000

* cited by examiner

*Primary Examiner* — Stephen Hong
*Assistant Examiner* — Matthew Ludwig
(74) *Attorney, Agent, or Firm* — Fitzpatrick, Cella, Harper & Scinto

(57) ABSTRACT

Upon layout of plural contents on a sheet, containers to lay out the contents are automatically generated based on the sizes of the contents. The generated respective containers for the plural contents are arranged such that the containers are included in a sheet size. The plural contents are laid out with the arranged respective containers.

7 Claims, 20 Drawing Sheets

FIG. 10
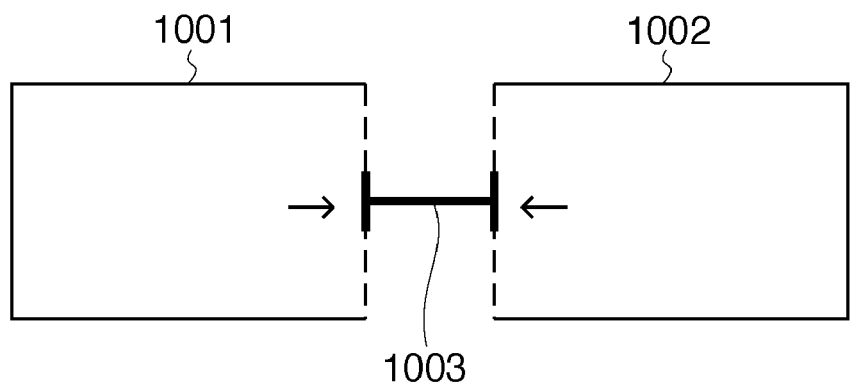
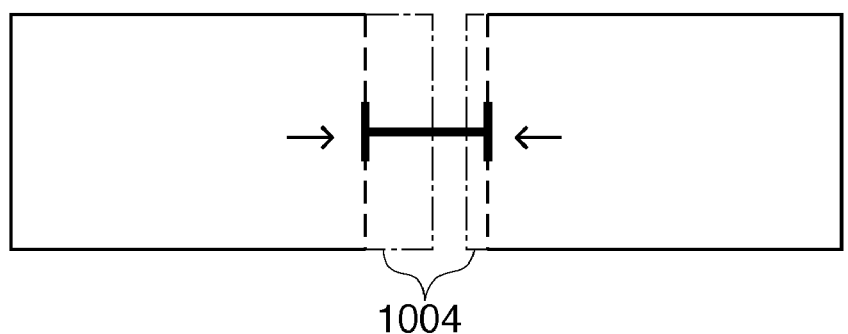
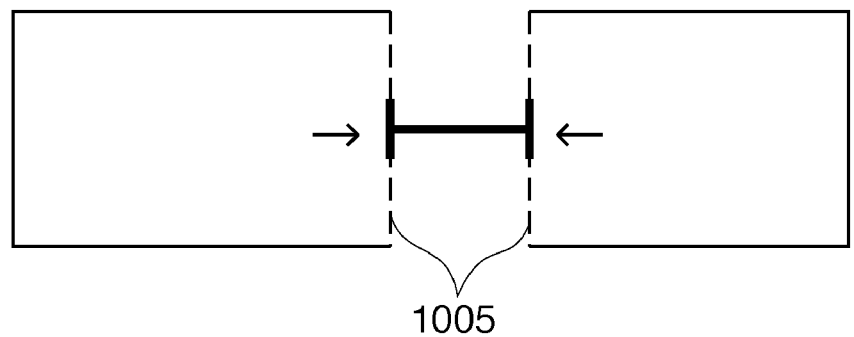

F I G. 12
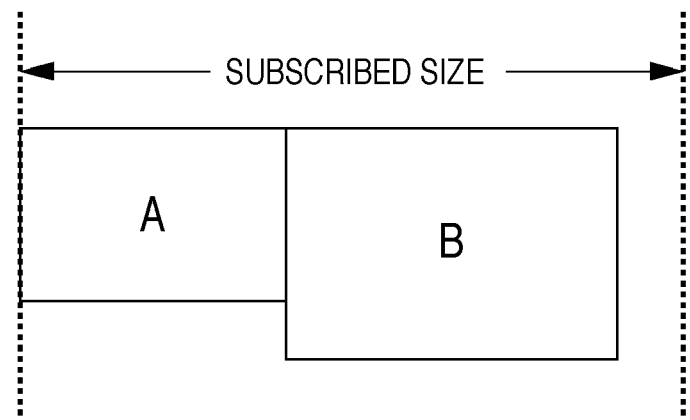
F I G. 13
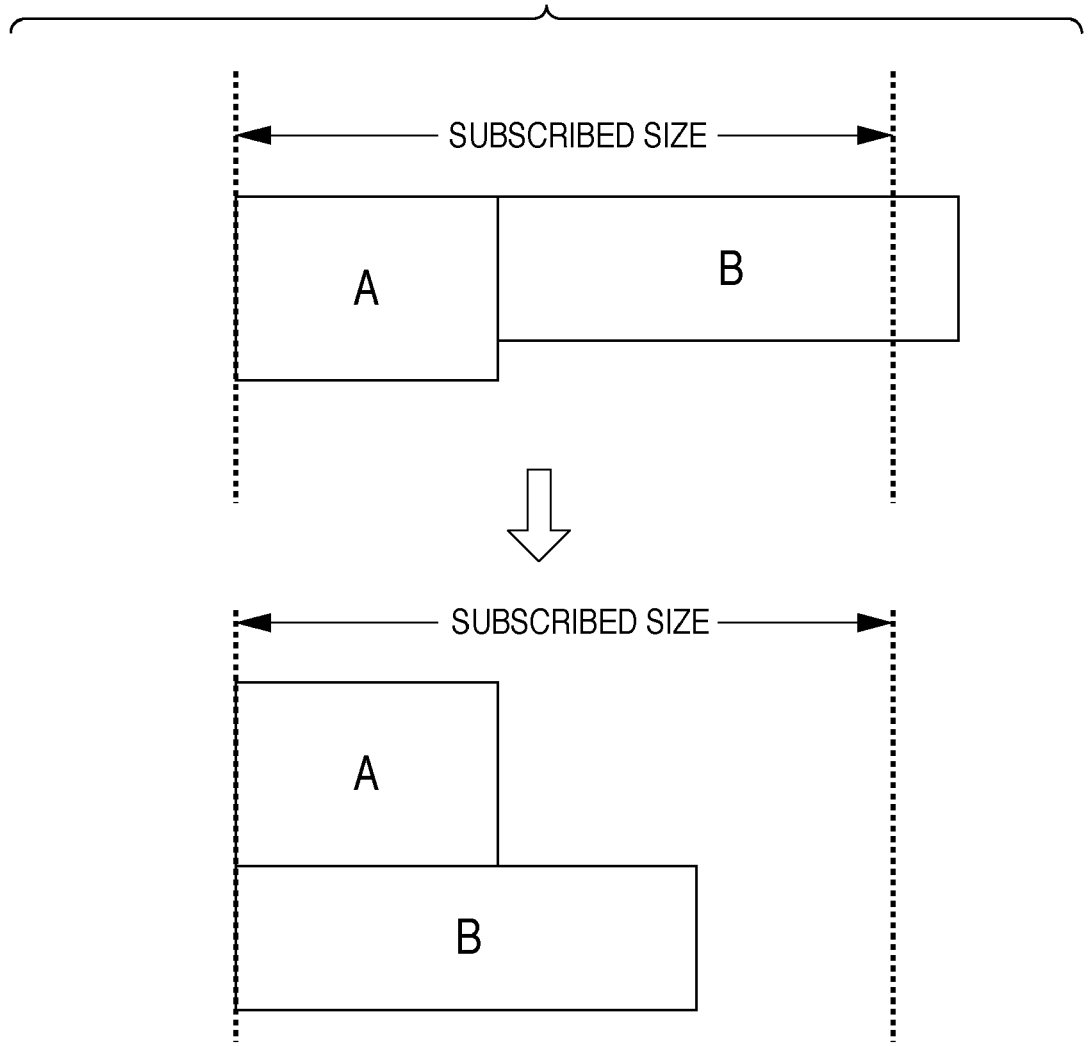

LAYOUT EDITING APPARATUS AND LAYOUT EDITING METHOD

BACKGROUND OF THE INVENTION

1. Field of the Invention

The present invention relates to a layout editing apparatus and a layout editing method.

2. Description of the Related Art

In recent years, the necessity for CRM and one-to-one marketing attracts attention because of shortened product life cycles due to multi-product production and consumers' preference for customize services due to widespread use of the Internet, so as to increase customer satisfaction and acquire new customers and enclose the customers by using these methods.

Note that the "CRM" is abbreviation for Customer Relationship Management. The One-to-One marketing means a kind of database marketing of constructing a database of personal attribute information of each customer such as age, sex, hobby, preference and purchase history, analyzing the contents and providing an offer appropriate to the customer. As a typified On-to-One marketing method, variable printing can be given.

Especially nowadays, in accordance with the progress of DTP (Desk Top Publishing) technique and popularization of digital printers, a variable printing system to customize and output a document for each customer has been developed. Then an optimum layout of contents in different amounts for respective customers is required.

Conventionally, the variable printing system generates a layout with containers or the like on a document, and links the database to the layout. However, as the sizes of the containers for texts and images are fixed, upon insertion of data in the database into the containers, when the data amount is larger than the container size, text overlap, image loss or the like occurs. On the other hand, when the data amount is smaller than the container size, a clearance is generated.

To solve this problem, an automatic layout system has been proposed. The automatic layout system is capable of variably setting the sizes of containers for texts and images. Further, an automatic layout system capable of variably setting container sizes and increasing the container size in correspondence with the amount of inserted data is also known. Further, a technique of, upon handling texts, when data in a size without a fixed container size is inserted, reducing the font size of the text so as to display all the text in the container is also known.

However, when the container size is bigger, the container is overlapped with another container on the same document. Further, upon adjustment of font size, when the amount of text is large, the font size becomes too small.

As another automatic layout technique to solve the above problems, a "layout designing device" which reduces the size of a container when the size of adjacent container becomes bigger, is disclosed in Japanese Patent Laid-Open No. 2000-48216.

Further, as a variable printing system, in addition to a technique of laying out 1 record on 1 document, a multi-recording technique of laying out a large number of records on 1 document is known. With this technique, it is possible to lay out different numbers of data for one customer, and generate a more customized document for each customer.

In variable printing, a system to dynamically change a layout frame (container) in correspondence with content sizes to appropriately lay out contents in different sizes is known. However, the system is used on the premise of use of with templates with respect to a database. To users, it is difficult to generate templates, and high level of knowledge to use a layout engine is required.

When a list of contents in various shapes and sizes extracted from various sources is made, or when automatic layout is performed without template, the array of contents is inefficient and wasteful margins occur in some layouts.

SUMMARY OF THE INVENTION

The present invention provides an apparatus and a method for automatic generation and arrangement of containers to lay out contents within a sheet size, thereby laying out plural contents.

According to one aspect of the present invention, there is provided a layout editing apparatus for laying out a plurality of contents comprising: a generation unit that generates a plurality of containers to lay out the plurality of contents based on sizes of the contents; an arrangement unit that arranges the plurality of containers for the plurality of contents, generated by the generation unit, so as to be included in a predetermined area; and a layout unit that lays out the plurality of contents in the respective containers arranged by the arrangement unit.

According to another aspect of the present invention, there is provided a layout editing method for a layout editing apparatus for laying out a plurality of contents, comprising: generating a plurality of containers to lay out the plurality of contents based on sizes of the contents; arranging the generated plurality of containers, for the plurality of contents, so as to be included in a predetermined area; and laying out the plurality of contents in the arranged respective containers.

Further features of the present invention will become apparent from the following description of exemplary embodiments with reference to the attached drawings.

BRIEF DESCRIPTION OF THE DRAWINGS

FIG. 10 is an explanatory view of an example of UI display for the layout calculation;

FIG. 12 is an explanatory view of basic arrangement of containers on sheet space;

FIG. 13 is an explanatory view of another basic arrangement of the containers on sheet space;

DESCRIPTION OF THE EMBODIMENTS

Hereinbelow, preferred embodiments of the present invention will now be described in detail in accordance with the accompanying drawings.

Prior to explanation of automatic layout processing according to the present invention, the configuration of a printing system to which the present invention is applicable will be described.

[System Configuration]

Figure 1:
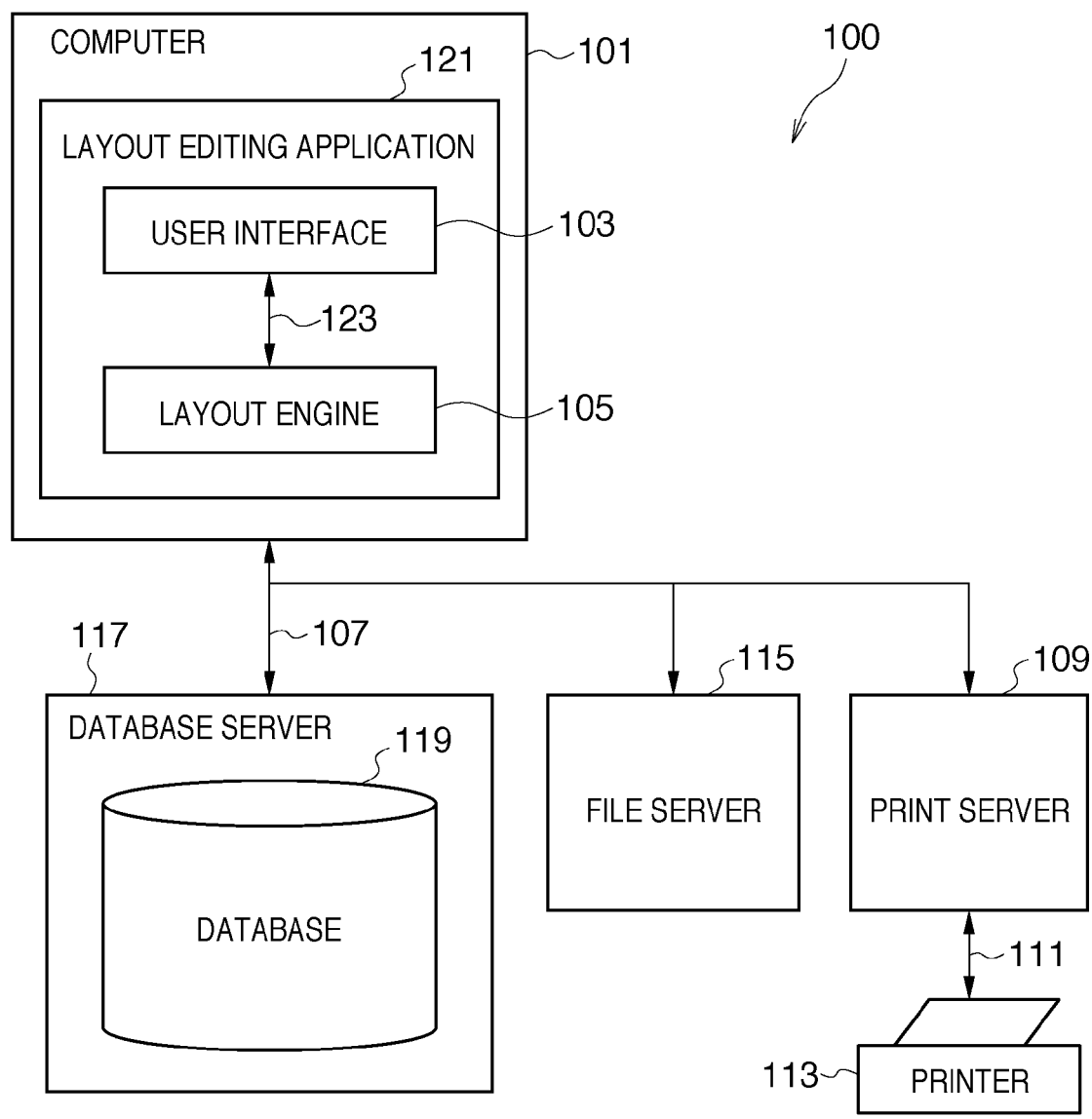
FIG. 1 is a block diagram showing an example of the configuration of a printing system to print a variable data document.

FIG. 1 shows an example of the configuration of a printing system to print a variable data document. As shown in FIG. 1, a printing system 100 has a general-purpose computer 101 to perform automatic layout processing according to the present invention, a database server 117, a file server 115 and a print server 109. Further, the computer 101 and the respective servers 117, 115 and 109 are interconnected via a network 107.

The database server 117 is a computer for management of a database 119 which is a typical database as a data source for document generation. The computer 101 communicates with the database server 117 via the network 107.

The file server 115 is a computer for storage of a document generated with a document template merged with data in variable data document printing. Further, the document may be stored in a local file system in the computer 101 or may be directly printed by a printer 113.

The print server 109 is a computer to provide a network function to connect the printer 113 which is not directly connected to the network 107. The print server 109 and the printer 113 are interconnected via a typical communication channel 111.

Note that the automatic layout processing is performed with the entire or a part of software such as a layout editing application 121 in the computer 101. Further, the layout editing application 121, which instructs to perform variable data printing (VDP), includes two software components.

A layout engine 105 calculates the positions of rectangles and lines based on constraints and sizes given within a rectangular range. A user interface 103 allows a user to generate a document template, and provides a mechanism for linking to a data source in the document template. Note that the user interface 103 and the layout engine 105 communicate with each other via a communication channel 123.

Figure 2:
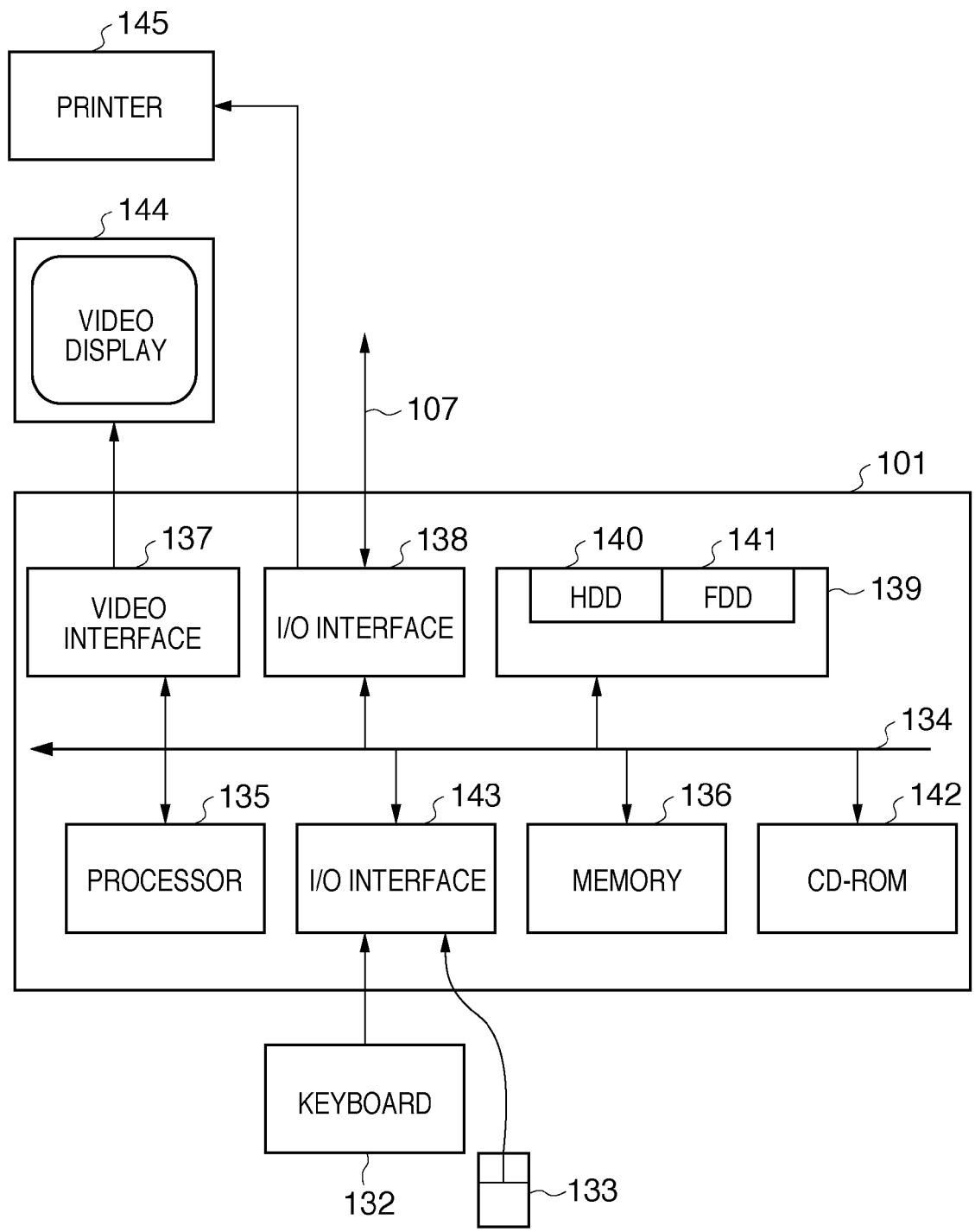
FIG. 2 is a block diagram showing an example of the configuration of a computer 101 shown in FIG. 1.

FIG. 2 shows an example of the configuration of the computer 101 shown in FIG. 1. In the example in FIG. 2, the computer 101 is connected with a keyboard 132, a mouse (pointing device) 133 and the like via an I/O interface 143. The keyboard 132 and the mouse 133 function as input devices. Further, the computer 101 is connected to a video display 144 via a video interface 137 and to a local printer 145 via an I/O interface 138. The video display 144 and the printer 145 function as output devices.

Note that the above-described keyboard 132, the mouse 133 and the video display 144 function as a user interface 103 shown in FIG. 1.

Further, the computer 101 is connected to other computers in the system 100 connected to the network 107 via the I/O interface 138. Note that the network 107 is typified by a local area network (LAN) or a wide area network (WAN).

Further, the computer 101 typically includes at least one processor 135 and a memory 136 having, for example, a semiconductor random access memory (RAM) or a read only memory (ROM). Further, the computer 101 typically includes a storage device 139 having, for example, a hard disk drive 140 or a flexible disk drive 141. Although not shown, the computer 101 may include a magnetic tape drive and the like. Further, a CD-ROM drive 142 is provided as a nonvolatile data source.

The above-described respective components of the computer 101 are interconnected via an interconnection bus 134, and controlled by a processor 135 which performs processing based on an operating system on the memory 136.

The layout editing application 121 shown in FIG. 1 typically is resident in the hard disk drive 140, and the processor 135 is read into the memory 136 upon execution, and performs processing. In layout editing processing, data on the database server 117 is obtained via the network 107, and stored in the memory 136.

Figure 3:
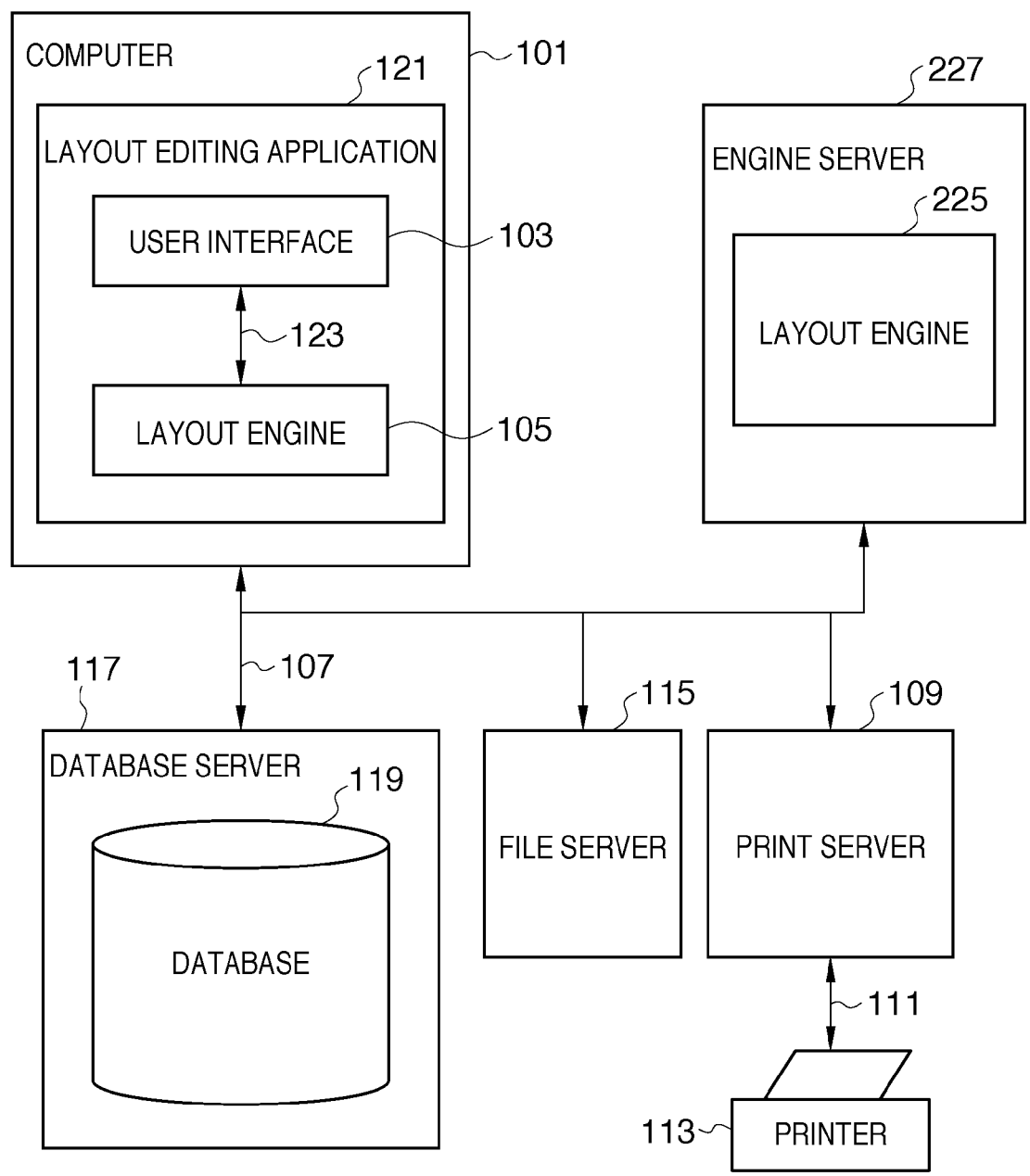
FIG. 3 is a block diagram showing an example of the configuration of the printing system to which an engine server is added.

FIG. 3 shows an example of the configuration of the printing system to which an engine server is added. In FIG. 3, the system further includes an engine server 227 including a layout engine 225 separate from the layout engine 105 shown in FIG. 1. Note that the engine server 227 is a typical computer.

The document template stored on the file server 115 may be connected to the data held in the database 119 to generate a document with the layout engine 225 for the purpose of printing or the like. This operation is requested via the user interface 103, or printing of a particular record is requested.

[Structure of Application]
[Main Screen]

Figure 4:
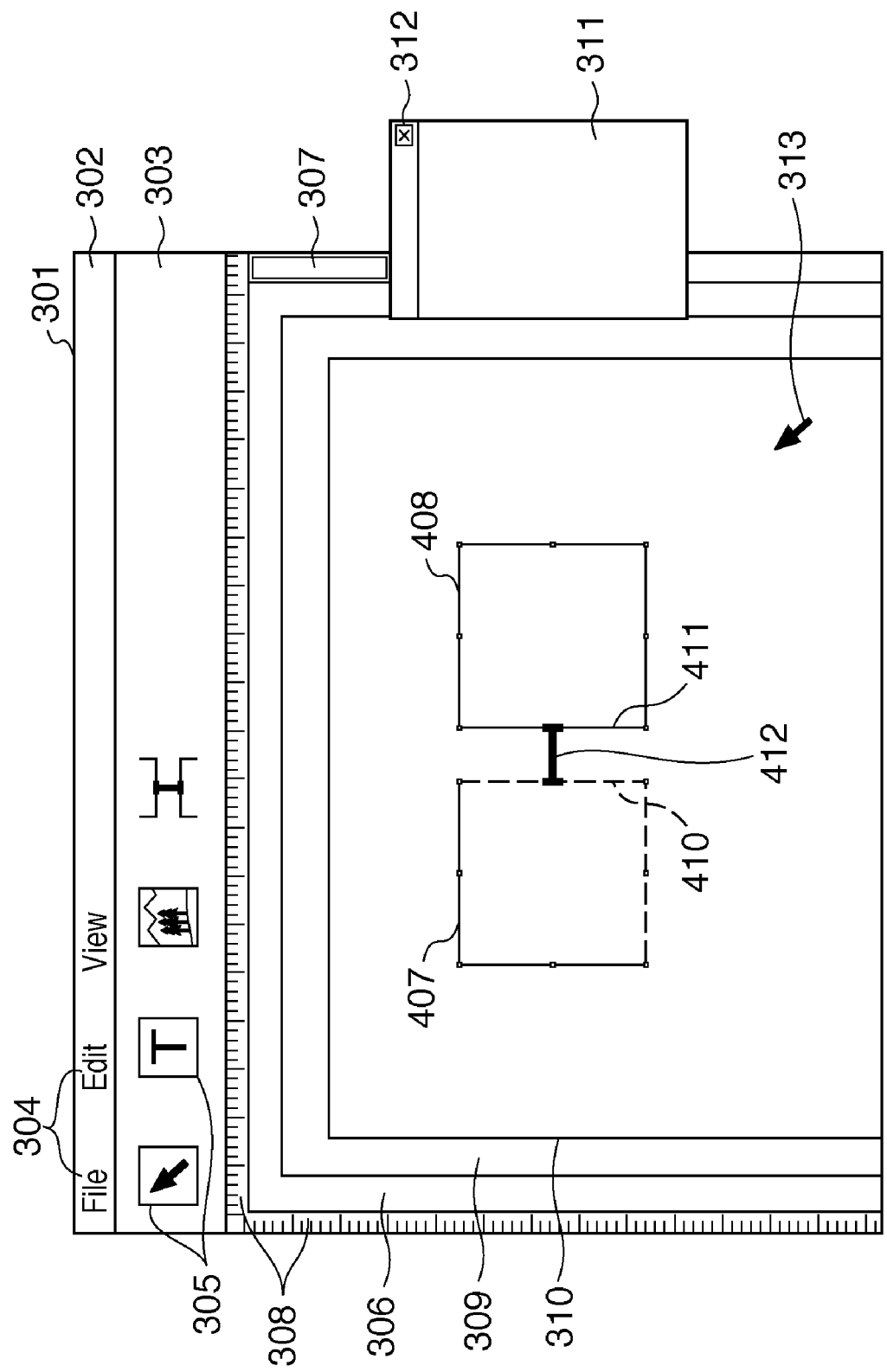
FIG. 4 is an example of a user interface screen.

FIG. 4 shows an example of a user interface screen. The user interface screen is formed with an application window 301 displayed on the video display 144 upon operation. A menu bar 302, a tool bar 303, a work area 306 movable in accordance with the position/operation of the mouse 133, and an optional pallet 311 and a cursor (pointer device) 313 are displayed on the application window 301.

The menu bar 302, as a well-known technique, has many menu items 304 expanded below a layer of menu option. A tool bar 303 has widgets 305 such as many tool buttons displayable/non-displayable in a particular mode of application.

An optional ruler 308 is used for indication of positions of a pointer, a page, a line, margin guides, a layout frame (hereinbelow, referred to as a "container") or an object in the work area 306.

The pallet 311 is used for access to an additional function such as a library to read and display variable data. The pallet 311 has a window control 312 for movement, resizing and closing of a window.

Further, the tool bar 303 has at least following user-selectable "buttons".

Selection tool button: used for selection, movement, size change, resizing, lock/unlock of a container side. Plural containers can be selected by dragging a selection box around containers or continuously depressing a CTRL key while selecting plural containers.

Image container tool button: used for generation of a container having a static or variable image.

Text container tool button: used for generation of a container having a static or variable text.

Link tool button: used for control of a distance between containers.

[Document Template]

The work area 306 is used for display and editing of the design of a document template. This allows the user to design a quick sketch of a document and to understand how the merged document will be changed based on the amount and size of variable data.

When an external data source is linked to the template, to preview the current document, variable text(s) and image(s) are displayed on containers on the template.

Further, a visual measure to draw the document structure and containers for variable data is always displayed when the cursor 313 is moved on containers 407 and 408 or when the containers 407 and 408 are selected.

Further, the work area 306 includes a scroll bar 307, the optional ruler 308, and a document template 309. The document template 309 indicates that plural pages exist in the template.

The page size of the given document template is designated by the user as a well-known technique. The actual number of pages of each document may be changed in accordance with variable data. For example, when the data cannot be fitted within 1 page, an additional page is automatically generated.

Numeral 310 assigned to the border line in each page denotes an arbitrary page margin indicating a maximum width of an object printable on the page.

Further, FIG. 4 includes an example of objects which can be displayed on 1-page document template 309. The objects have a large number of containers 407 and 408, an unfixed side 410, and a link 412.

[Container]

The container is space to hold a fixed or variable text or image in the document template 309. The containers are laid out while mutually acting on other containers and objects. The container is indicated with a user interface using the cursor 313, and can be subjected to movement, size adjustment or regeneration.

More exactly, the container enables a set of settings, visual representation, interaction and editing. The followings are definitions of the container.

A container has a fixed or variable content. The variable content, obtained from a data source, differs by document, is dynamic in this meaning. Note that a case where a variable content includes a time-changing content such as animation is not appropriate to printing, therefore it is not intended. Similarly, the fixed content is displayed as the same content in all the documents generated by using the container. However, even the fixed content, when influenced by an layout operation of variable content, the position of the fixed content on each document may be different.

The container has a text setting decoration function such as a background color, a border and a font style applied to a content.

The container is merged with data from a data source upon generation of a document. The variable content displays particular data obtained from a data source. The display by the container may be, for example, printed, displayed on the video display 144, or may be printed and displayed.

The container has an interactive GUI having a user interface for, for example, container editing or display setting. The elements of the interface are typically displayed on the video display 144. However, these elements are not printed on a document. This user interface displays some of the decoration functions of the container such as the background color and the font, and further, displays the interface elements to allow editing and display of container settings.

[Constraints of Container]

The container is under constraints to control linkage of contents displayed on respective documents. These constraints (with linkage of fixed and variable contents) provide a primary method to a user for controlling layout display of a large number of documents from one document template.

An example of the constraints is "The maximum height of the content of this container is 4 inches". Further, another example of the constraints is "The left edge of the content of the container must be displayed in the same horizontal position in any document". The following description gives various methods for display and editing of the constraints using a GUI.

Note that a content place holder, which designates arrangement of a fixed content such that an image has a place defined on a page, is well-known in a digital printing technique. In the following study, it may be assumed that the container has a position and a size which are edited and displayed by a well-known technique. Instead, in this study, display and editing by a method specialized for variable data printing is discussed.

Further, the container allows the user to designate the size and position of a content in a document. To generate plural document layouts from one document template, the container is utilized as a user interface to designate and display possibilities and constraints of a large number of layouts. The display and layout operation will be further described later.

[Display and Editing of Container]
[Generation of New Container]

The container is described as a text container and an image container. The text container has a fixed text or a variable text received from a database. The image container has an embedded image or a variable image received from a database.

New text container and image container are generated with a text container tool to click and select from the widgets 305 and with an image container tool to drag a rectangular area, using the mouse 133, on the document template 309.

Similarly, the container may be simply generated by activating an appropriate tool and clicking on the document template 309. In this case, a container in a default size may be inserted, otherwise, a dialog box may be provided so as to input the size of the new container.

[Display of Container]

The side of the container defines a virtual border line upon display of its linked content in the document. For example, when the container is used as a user interface, the left side of the container is treated as a displayable leftmost side for the linked content in any document. Further, the height of the container can be understood as a constraint of height displayable for the linked content in the generated document. In this example, it is assumed that the side and size of the container are changed through the user interface 103.

In the following description, the rules of relation between several user interfaces used for limiting content layouts and the layouts are defined.

When the right and left sides of a container are solid lines, the width of the container is fixed. When the width of the container is fixed, the width allocated to the linked content is the same in all the documents. However, the height of the container might be changed.

When the upper and lower sides of the container are solid lines, the height of the container is fixed. When the height of the container is fixed, the height allocated to the linked content is the same in all the documents.

When the constraint of distance is fixed, the designated distance is the same in all the documents.

When the container constraints are connected to the solid line side of the container, the container is pushed with another container which is connected with the constraints, thereby its position may be changed. The constraints with respect to the upper and lower sides cause a positional change in the vertical direction, and the constraints with respect to the right and left sides cause a positional change in the horizontal direction.

The antonym of "fixed" is "variable" meaning that the side, position and document constraints may be changed by document. Examples of the rules of relation between a user interface to realize "variable" and layouts are as follows.

When the right and left sides of a container are dotted lines, the width of the container is variable. When the width of the container is variable, the width allocated to the linked content is changed by document.

When the upper and lower sides of the container are dotted lines, the height of the container is variable. When the height of the container is variable, the height allocated to the linked content is changed by document.

When the constraint of distance is variable, the designated distance may be changed by document. By setting the distance constraint, within limitations of maximum length and minimum length, a layout operation to adjust the distance between the containers can be performed.

When the container constraints are connected to the dotted line side of the container, the container pushes another container connected with constraints, thereby changes the position of the pushed container. The constraints with respect to the upper and lower sides cause a positional change in the vertical direction, and the constraints with respect to the right and left sides cause a positional change in the horizontal direction.

Figure 5:
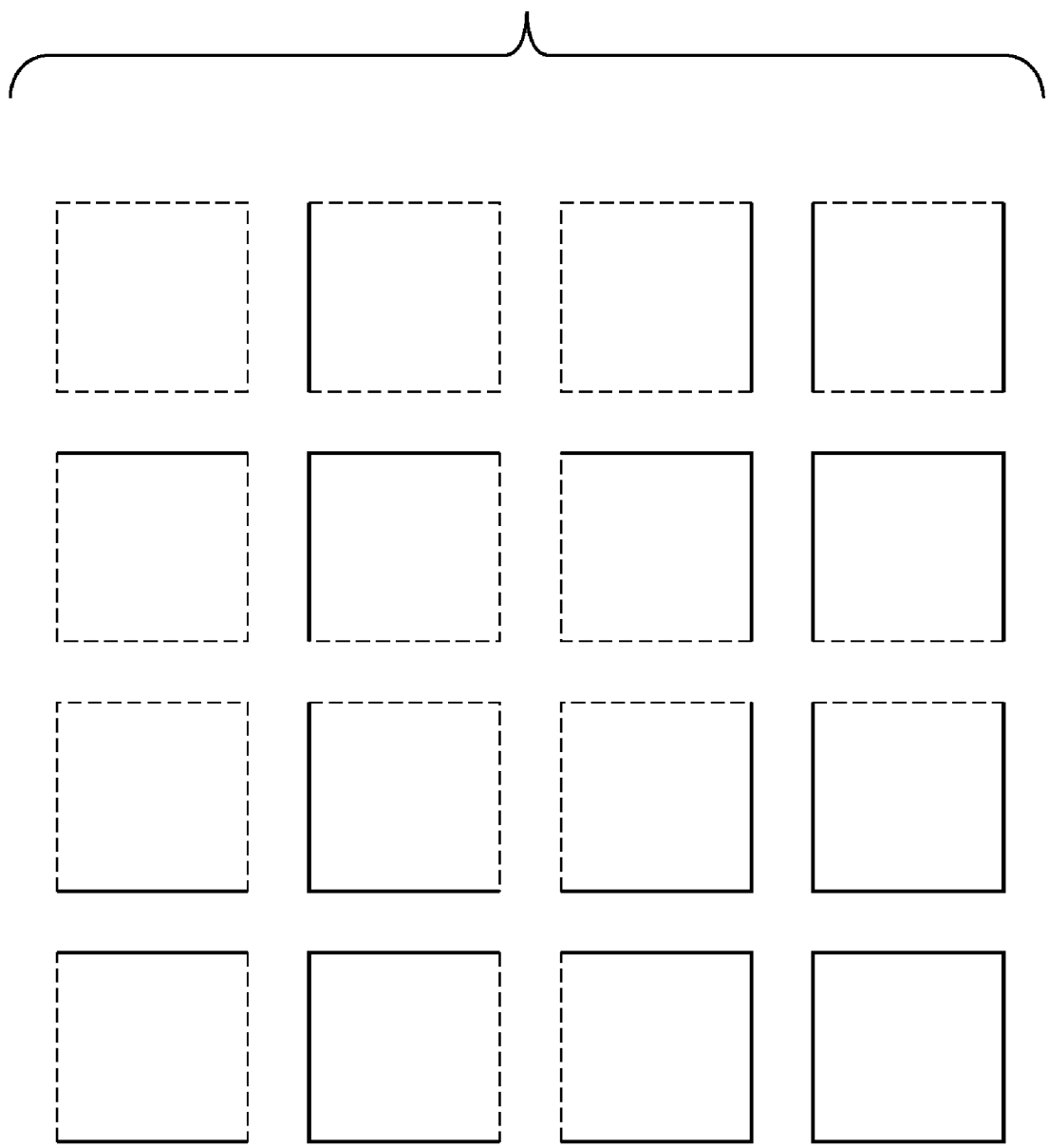
FIG. 5 illustrates container side statuses (16 ways) based on rules.

FIG. 5 shows container side statuses (16 ways) based on the rules. Generally, as the statuses of the container side are elements displayed as assistance in design of the document template, these statuses are not drawn on a printed matter.

The minimum and maximum width and height values set as constraints of the container are displayed on a secondary dialog display (pallet 311).

Figure 6A:
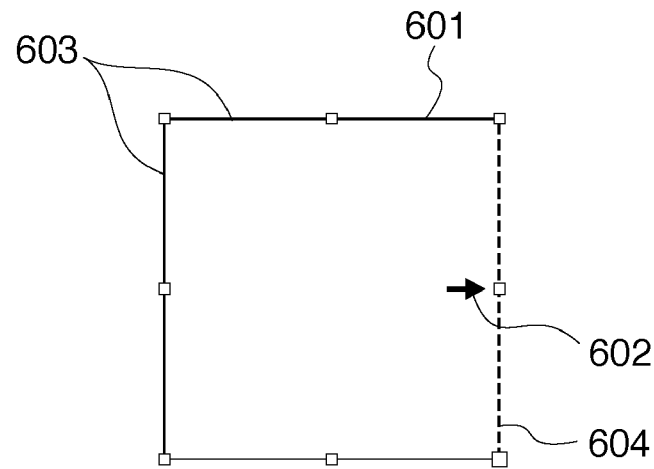
FIGS. 6A to 6C are explanatory views of typical container rules in an embodiment of the present invention.
Figure 6B:
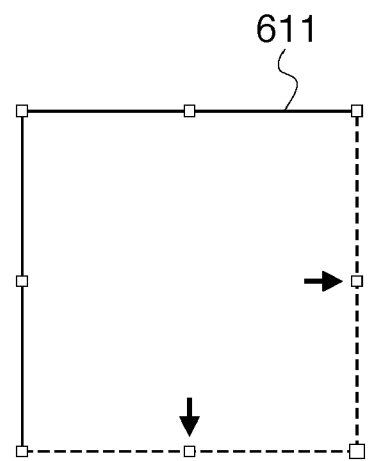
Figure 6C:
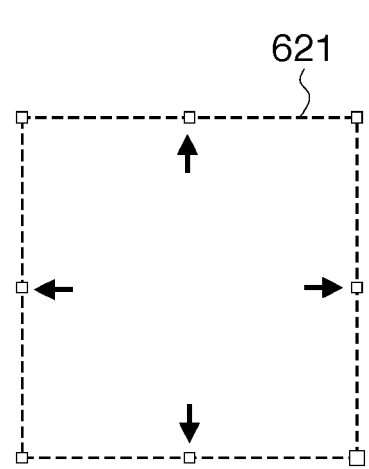

FIGS. 6A to 6C are explanatory views of typical container rules in the present embodiment. FIG. 6A shows a pattern 1 where the width of a container 601 is variable. In this example, a side 603 is represented as a solid line, and a variable side 604, as a dotted line. Further, an expansion/reduction icon 602 is an optional indicator which indicates that the adjacent side 604 is variable.

Further, FIG. 6B shows a pattern 2 where the width and height of a container 611 are variable. FIG. 6C shows a pattern 3 where the width and height of a container 621 are variable.

[Link Setting]

Figure 7:
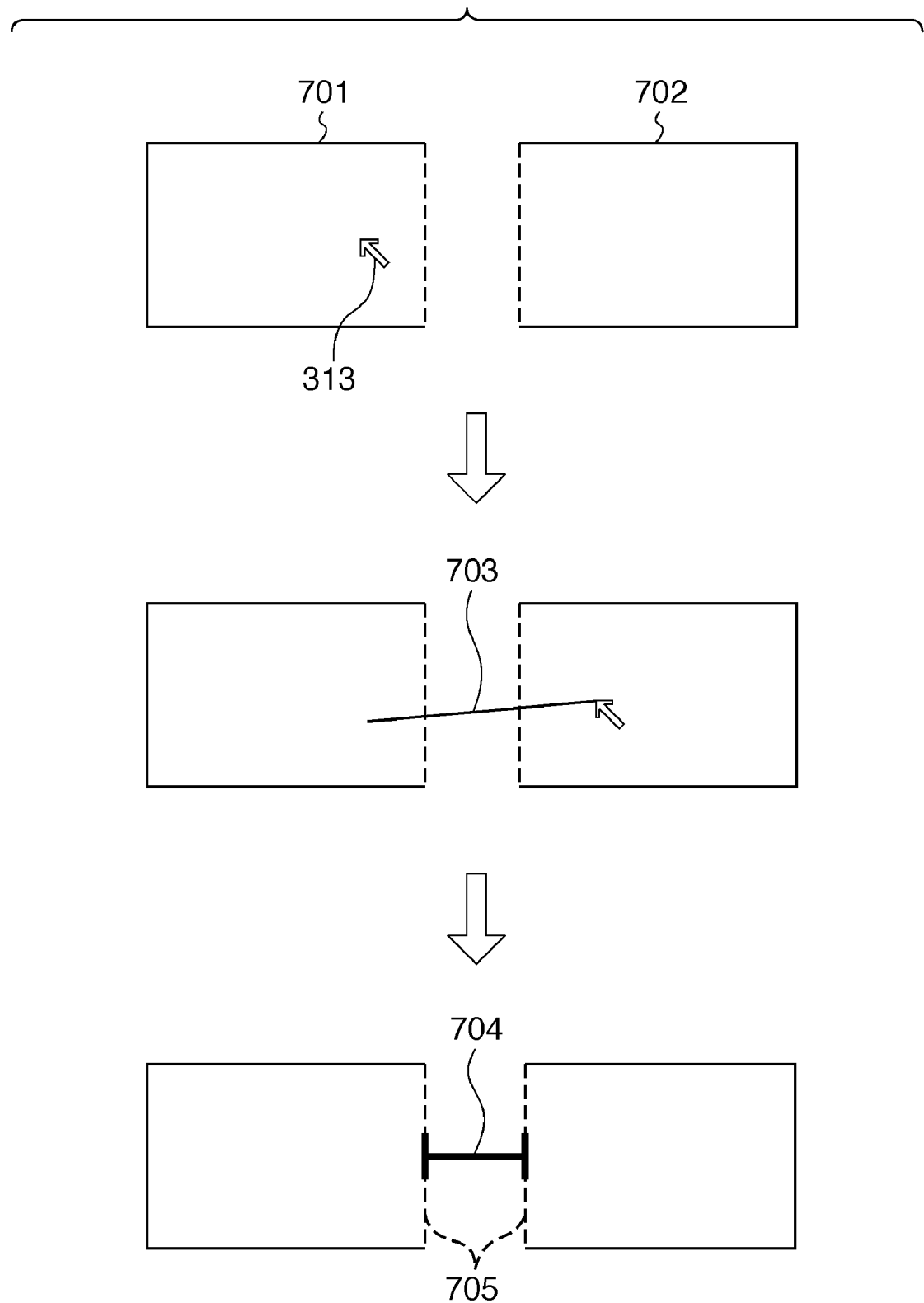
FIG. 7 is an explanatory view of an example of UI for link setting.

FIG. 7 shows an example of UI for link setting. First, to set a link, at least two containers 701 and 702 are generated. As in the case of the containers 407 and 408 shown in FIG. 4, a solid line indicates a fixed side, and a dotted line, an unfixed side.

Next, the cursor 313 is moved to the container 701 where a link is set, a click is made on the container 701, then the cursor 313 is moved to the other container 702, and a click is made on the container 702. A line 703 connecting the click position on the container 701 and the click position on the container 702 after the movement of the cursor 313 indicates the positions where the link is set for the user. Thereafter, a link UI 704 is displayed, and the link setting is terminated.

A side indicated with a dotted line 705 is a variable side. In this design, the left container 701 has a size variable in the rightward direction. Further, the right container 702 has a size variable in the leftward direction. As these containers are linked to each other, the right and left containers, keeping the distance therebetween, operate so as to mutually adjust the sizes variably.

[Preview Processing]

Figure 8:
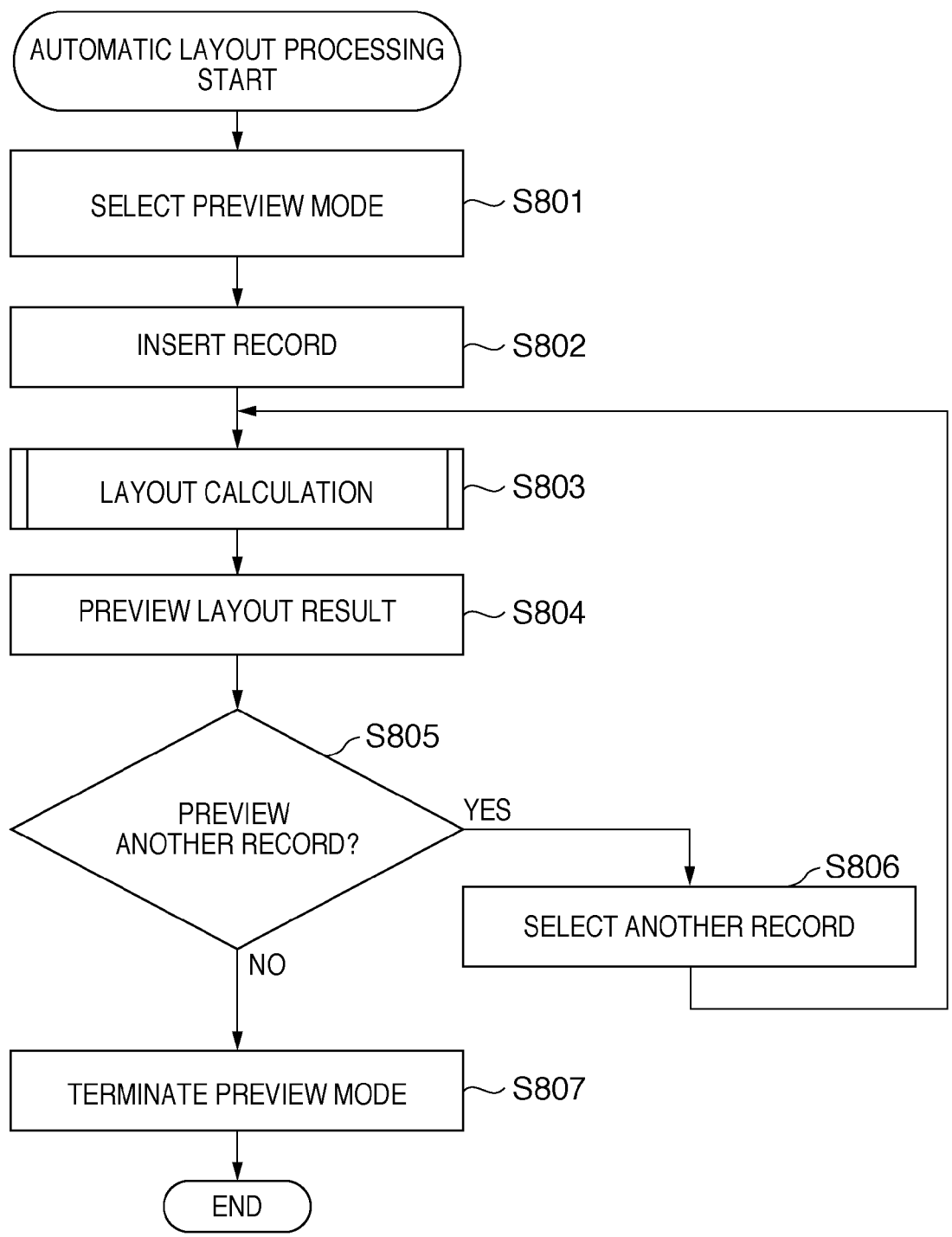
FIG. 8 is a flowchart showing processing in a preview mode.

FIG. 8 is a flowchart showing processing in a preview mode. An automatic layout system has a layout mode and a preview mode. In the layout mode, containers are generated, then linkage is made between the containers, and a layout is generated. In the preview mode, an actual data record on a database is inserted in the generated layout and the layout result after the insertion of the actual data value is previewed.

First, in step S801, when the preview mode is selected, a record to be previewed is inserted in step S802. Next, in step S803, layout calculation is performed so as to lay out the inserted record.

Next, in step S804, the layout calculated in step S803 is displayed. Then in step S805, it is determined whether or not the preview is to be changed to another record by the user's input in the preview mode. When it is determined that it is not necessary to preview the other record, the process proceeds to step S807, to terminate the preview mode.

On the other hand, when it is determined in step S805 that another record is to be previewed, the process proceeds to step S806, at which another record is selected, and the layout calculation is performed again in step S803. Then in step S804, the layout result is previewed, and the above-described processing is repeated.

Note that not in the preview mode but in printing, the layout calculation is sequentially performed for all the records to be printed. Accordingly, steps S805 and S807 do not exist. When the printing of all the records has been completed, the process ends.

[Layout Calculation]

Figure 9:
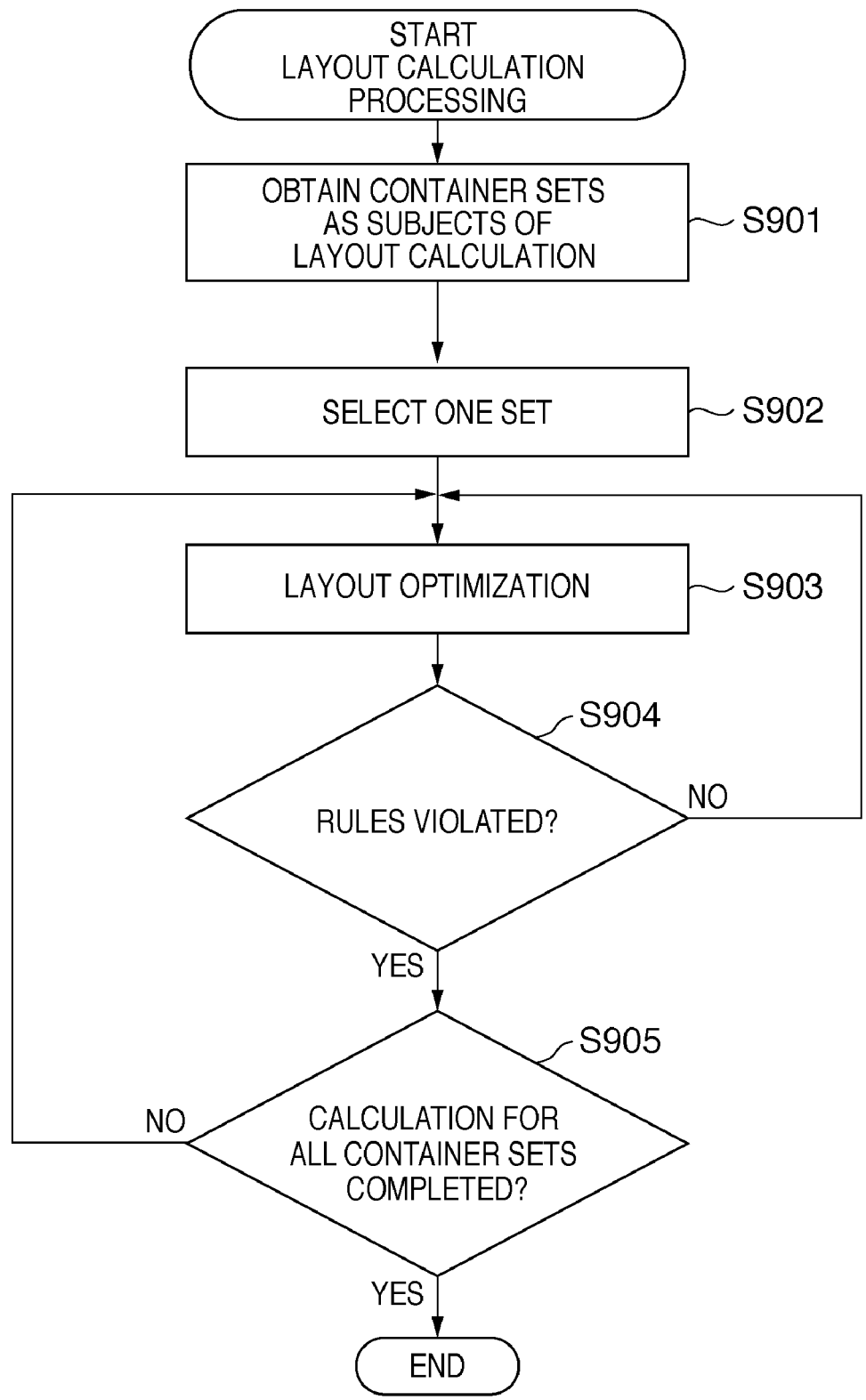
FIG. 9 is a flowchart showing the details of layout calculation in step S803 shown in FIG. 8.

FIG. 9 is a flowchart showing the details of the layout calculation in step S803 shown in FIG. 8. Further, FIG. 10 shows an example of the UI display of the layout calculation.

First, in step S901, to perform the layout calculation, a set of mutually-linked containers is obtained. In the layout calculation, the linked containers are handled as one set. Next, in step S902, one of the sets of containers obtained in step S901 is selected for the layout calculation. Then in step S903, for the selected set of container, a layout is calculated and optimization is performed.

In this example, layout optimization is performed such that the difference between the size of container to be laid out and that of an actual content is as small as possible. The layout optimization is performed such that in containers linked to each other for dynamic size change, the sizes of contents inserted in the respective containers and those in the layout result are as same as possible.

Upon layout optimization, it is determined in step S904 whether or not the rules are violated, and when it is determined that the rules are violated, the process returns to step S903, to again perform calculation not to violate the rules. The rules mean the constraints set by the user upon layout generation, that is, the size and position, side statuses, link length and the like of containers.

On the other hand, when a layout is calculated not to violate the rules in step S904, the layout of the set is completed. Next, in step S905, when the calculation for all the sets on the page has been completed, the processing ends.

In FIG. 10, two containers 1001 and 1002 indicate a status where a record is inserted and a layout is determined. In FIG. 10, a solid line indicates a fixed side, a dotted line, a variable side, and an arrow, a change direction of variable side. Further, numeral 1003 denotes information on a link between the containers 1001 and 1002.

In this status, when the record is changed and contents in different sizes are inserted, as shown in the status denoted by numeral 1004, the sizes of the new contents are superpose-displayed. Then the layout calculation is performed, and the result of layout calculation is displayed as indicated with numeral 1005. The calculation is performed such that the sizes of the respective containers after the calculation are different but they are equal to the sizes of actually inserted contents, and the above-described rules are not violated.

[Layout Editing]

Next, processing upon insertion of contents with respect to the layout editing application 121 will be described using FIGS. 11A and 11B.

Figure 11A:
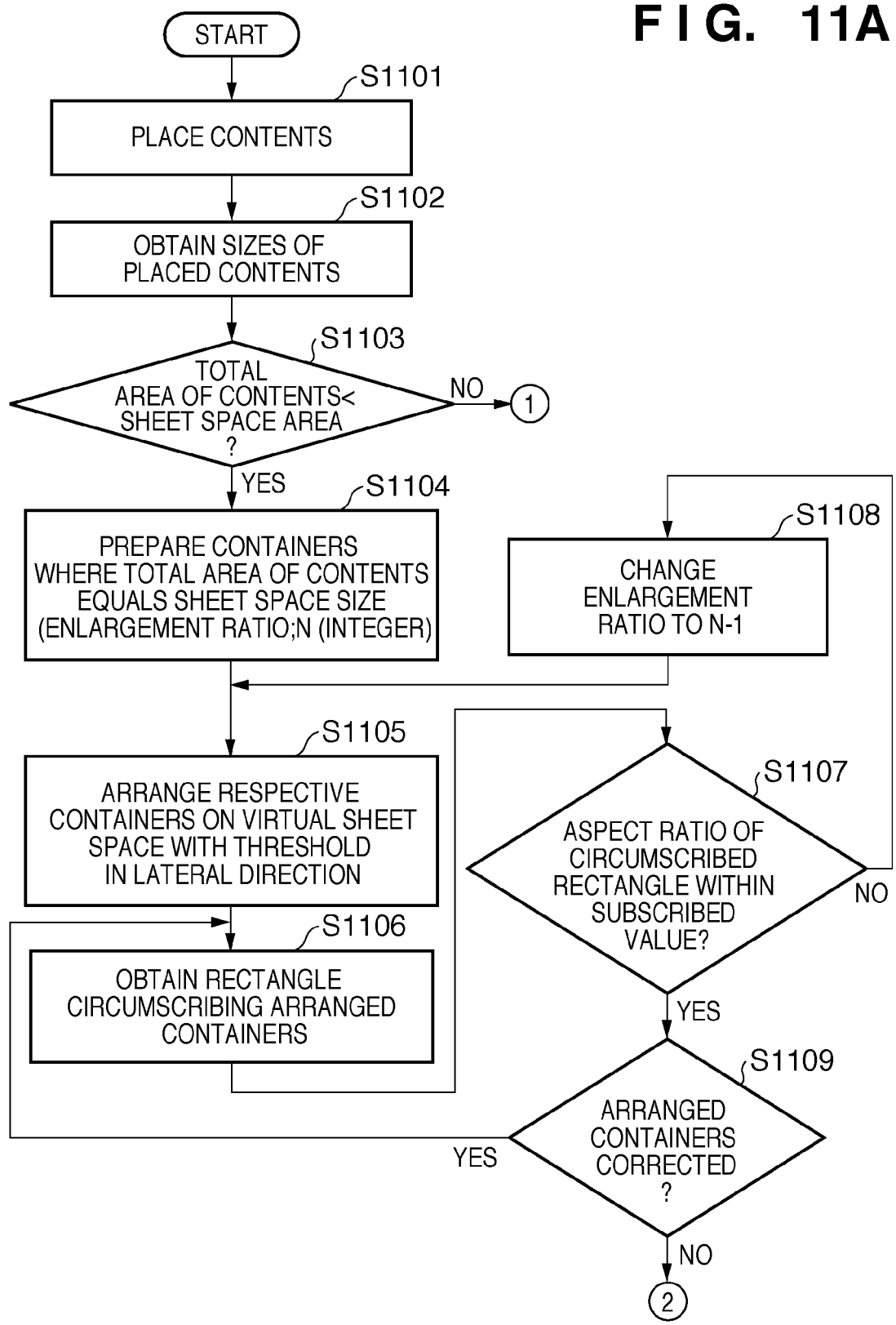
FIGS. 11A and 11B are flowcharts showing layout editing processing in the embodiment.
Figure 11B:
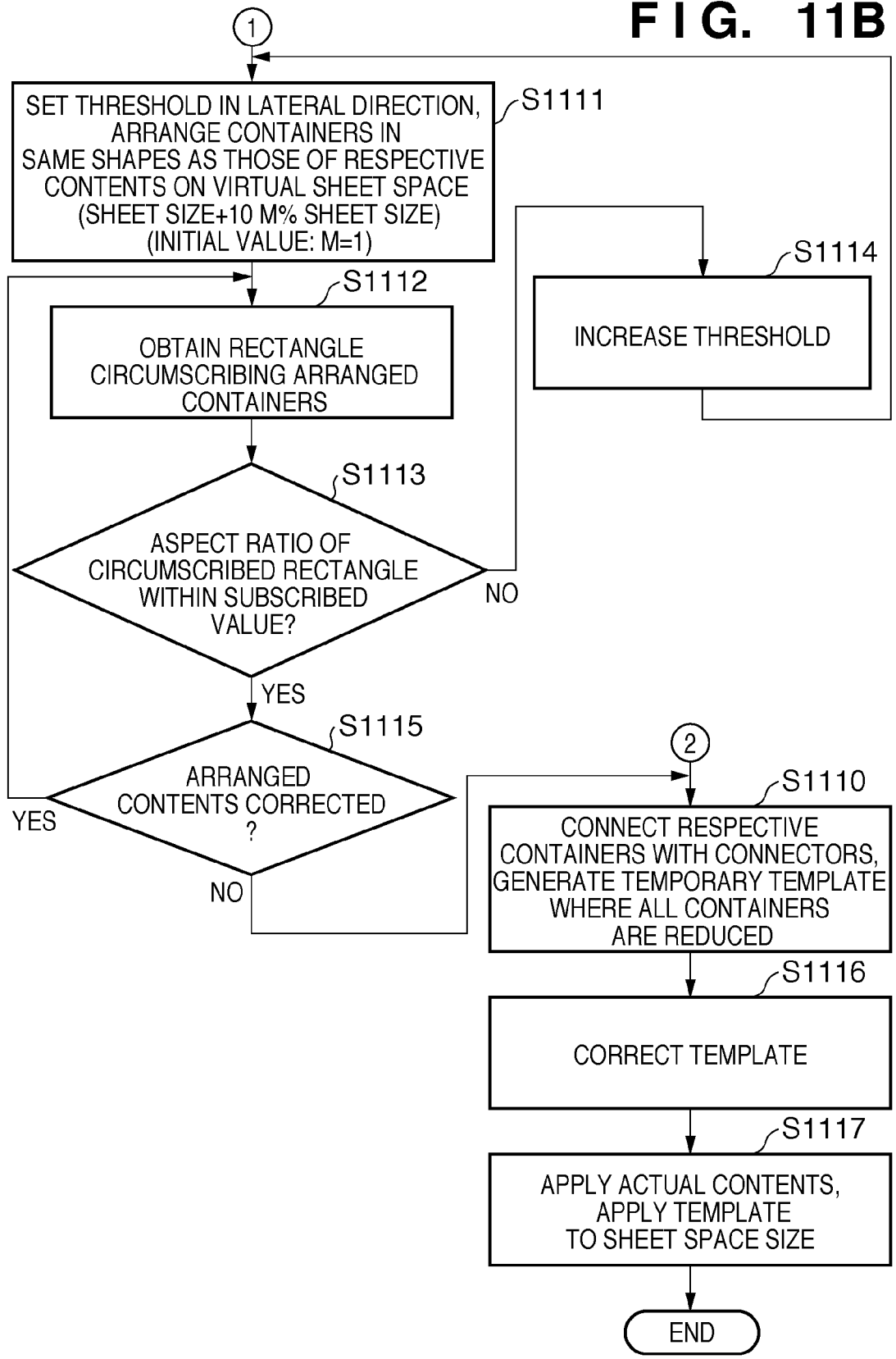

FIGS. 11A and 11B are a flowchart showing layout editing processing in the present embodiment. First, in step S1101, the layout editing application 121 recognizes inserted contents, then in step S1102, the sizes (vertical lengths and widths) of the inserted respective contents are obtained. Then in step S1103, the layout editing application 121 measures the areas of all the inserted contents, and compares the areas with the area size of the sheet space on which the contents are arranged. When the total area of the contents is smaller than the area size of the sheet space, the process proceeds to step S1104, while when the total area of the contents is larger than the area size of the sheet space, the process proceeds to step S1111.

In step S1104, the layout editing application 121 sets an enlargement ratio such that the total area of the contents becomes equal to the area size of the sheet space, and internally prepares containers having areas equal to the respective contents enlarged in accordance with the enlargement ratio. Then in step S1105, the layout editing application 121 arranges the containers generated in step S1104 on the sheet space. The arrangement on the sheet space is performed in accordance with a threshold value set in the horizontal direction, not to exceed the threshold value. Note that the details of the basic processing upon container arrangement will be described later.

Next, in step S1106, after the arrangement of the containers, the layout editing application 121 obtains a rectangle circumscribing the arranged containers. Then in step S1107, the layout editing application 121 determines whether or not the aspect ratio of the obtained circumscribed rectangle is within a prescribed size. When it is determined that the aspect ratio of the rectangle is without the prescribed size, the process proceeds to step S1108, while when it is determined that the aspect ratio of the rectangle is within the prescribed size, the process proceeds to step S1109.

In step S1108, as the rectangle circumscribing the temporarily arranged containers is without the prescribed size, the layout editing application 121 assumes that the sizes of the containers mismatched. Then the layout editing application 121 reduces the enlargement ratio n for the containers by a predetermined value. Then the process returns to step S1105, to again perform the container arrangement.

On the other hand, in step S1109, upon arrangement of the respective containers, the layout editing application 121 performs correction on blank spaces in respective lines. The correction changes the arrangement of the containers. When the correction is performed, the process returns to step S1106, to again perform the container arrangement. Further, when the correction is not necessary, the process proceeds to step S1110.

In step S1110, the layout editing application 121 connects the respective containers with connectors, and generates a temporary template where the entire area is reduced. At this time, a connector in the horizontal direction connects all the containers arrayed in the respective lines, and a connector in the vertical direction connects containers having the same side in a horizontal position. Note that the connector internally holds an ideal size.

Further, when the total area of the contents is larger than the area size of the sheet space, the layout editing application 121 assumes virtual sheet space to include all the contents in step S1111. Then the layout editing application 121 arranges the containers in sizes equal to the respective contents on the virtual sheet space. In this case, a width, obtained by adding a 10%×m of the horizontal width of the sheet space to the virtual sheet space, is set as a threshold value.

Next, in step S1112, after the temporary arrangement of the containers, the layout editing application 121 obtains a rectangle circumscribing the arranged containers. Then in step S1113, the layout editing application 121 determines whether or not the aspect ratio of the obtained circumscribing rectangle is within the prescribed size. When it is determined that the aspect ratio of the circumscribed rectangle is without the prescribed size, the process proceeds to step S1114, while when it is determined that the aspect ratio of the circumscribed rectangle is within the prescribed size, the process proceeds to step S1115.

In step S1114, since the rectangle circumscribing the temporarily arranged containers is without the prescribed size, the layout editing application 121 determines that the size of the virtual sheet space mismatched. Then the layout editing application 121 enlarges the threshold value of the horizontal size of the temporary sheet. Then the process returns to step S1111.

Further, in step S1115, upon arrangement of the respective containers, the layout editing application 121 performs correction on blank spaces in the respective lines. The correction changes the arrangement of the containers. When the correction is performed, the process returns to step S1112, to again perform the container arrangement. Further, when the correction is not necessary, the process proceeds to step S1110, to perform the processing to generate the above-described temporary template.

Next, in step S1116, the layout editing application 121 performs correction on the vertical-directional sizes of the containers arrayed in the horizontal direction of the generated temporary template. Then in step S1117, the layout editing application 121 applies actual contents to the template, and applies the template to the sheet size using a layout engine. Then the sheet space where the contents are arranged is displayed, and the process ends.

[Basic Processing Upon Container Arrangement]

Figure 14:
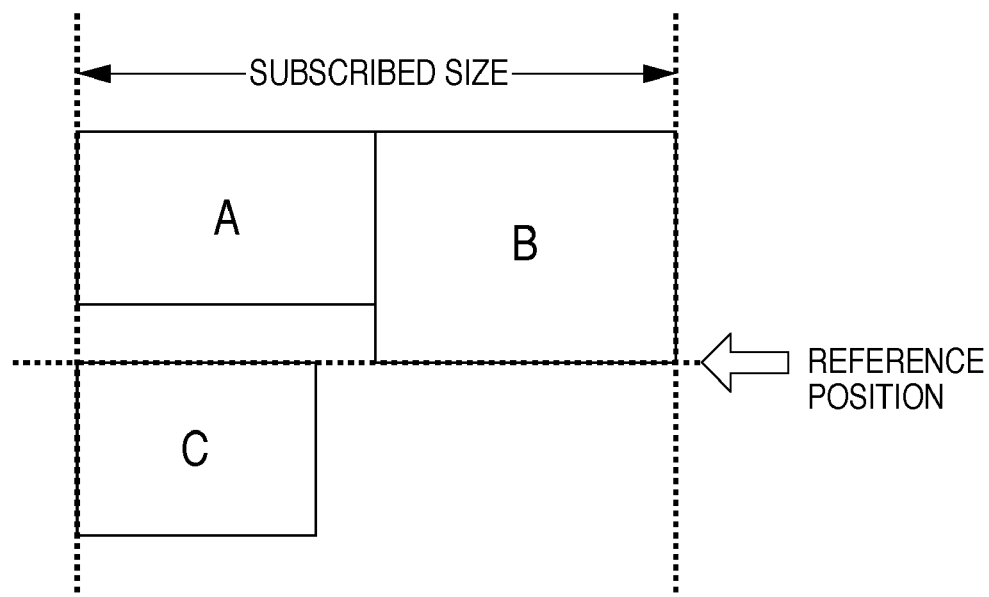
FIG. 14 is an explanatory view of another basic arrangement of the containers on sheet space.

FIGS. 12 to 14 show basic arrangements upon placement of the containers on the sheet space. When the containers are placed on the sheet space, basically, upon arraying the containers, it is determined whether or not the width of the array is within a prescribed value. In the example shown in FIG. 12, the containers are arranged such that the width of the array is within the prescribed value. Further, in the example shown in FIG. 13, when the containers are arrayed, the width of the array is without the prescribed width. The container which runs off the prescribed width is arranged in the next line. Further, in a line, the longest side in the vertical direction is determined as a reference size (reference position) of the line height. As shown in FIG. 14, the container arranged below the arrayed containers is aligned with the reference position.

[Prescribed Size]

Figure 15:
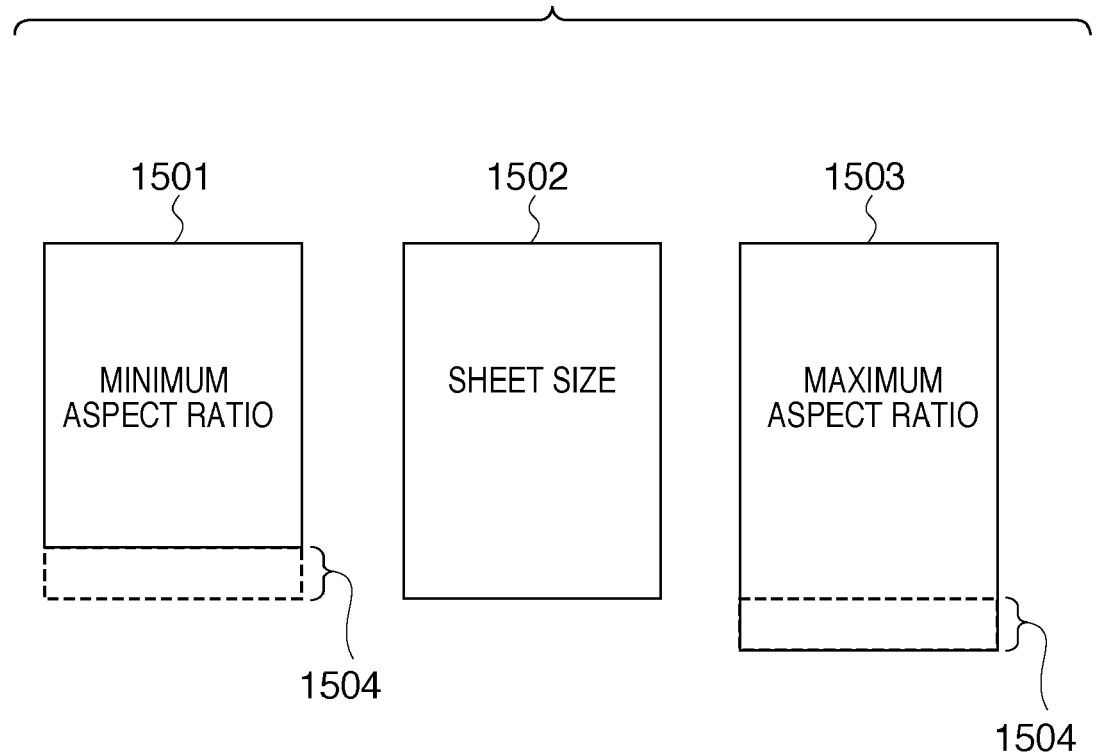
FIG. 15 is an explanatory view of a prescribed size determined in step S1107 shown in FIG. 11A.

FIG. 15 is an explanatory view of the prescribed size determined in step S1107 shown in FIG. 11A. As an example of the prescribed size, a figure having an aspect ratio as shown in FIG. 15 is used as a reference value.

Numeral 1501 denotes a minimum length/width value of the prescribed size. The length of the value 1501 is obtained by sheet length−(sheet length−sheet width)×(1/2), and as the aspect ratio, length(25.35)÷width(21.0)≅1.207 holds.

Numeral 1502 denotes a basic A4 sheet size. Numeral 1503 denotes a maximum value of length/width of the prescribed size. The length of the maximum value 1503 is obtained by sheet length+(sheet length−sheet width)(1/2), and as the aspect ratio, length(34.05)÷width(21.0)≅1.621 holds.

Numeral 1504 denotes a value to determine the prescribed size obtained by (sheet length−sheet width)×(1/2).

In this example, it is assumed that the containers are laid out on A4 sized sheet space, and when the container are laid out in a different sheet size, the maximum and minimum values of the prescribed size are changed based on the above-described calculation.

[Visualization of Main Processing]

Figure 16:
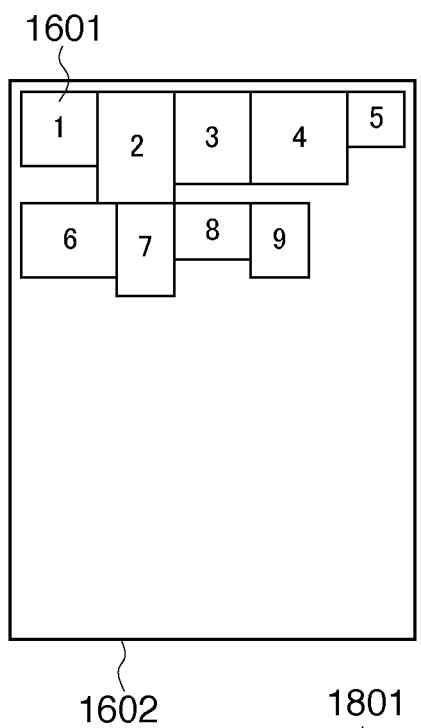
FIG. 16 is a particular example of container arrangement according to the processing shown in FIGS. 11A and 11B.
Figure 17:
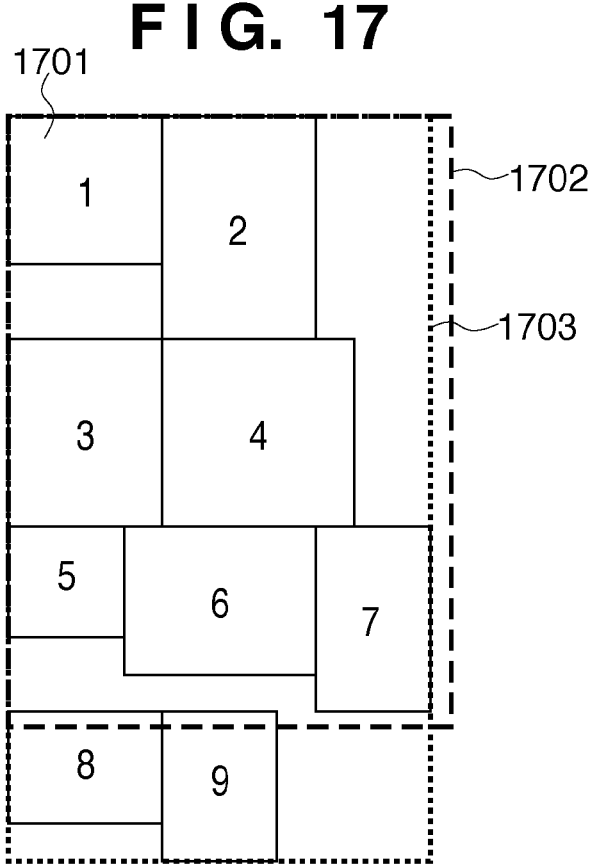
FIG. 17 is another particular example of container arrangement according to the processing shown in FIGS. 11A and 11B.
Figure 18:
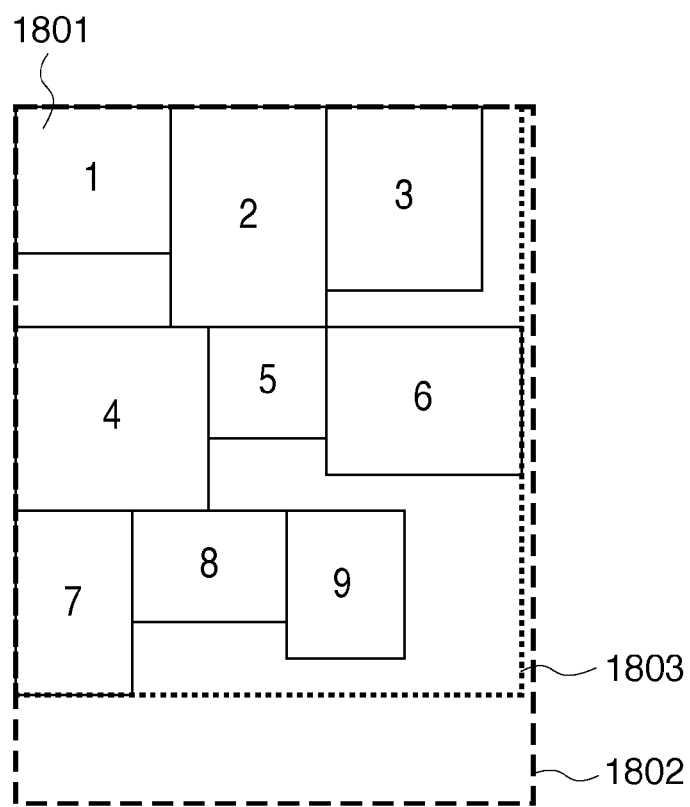
FIG. 18 is another particular example of container arrangement according to the processing shown in FIGS. 11A and 11B.

FIGS. 16 to 18 show particular examples of container arrangement in accordance with the processing shown in FIGS. 11A and 11B. In FIG. 16, numeral 1601 denotes a set of containers obtained from the group of contents inserted as an example. Further, the lengths and widths of the content group (1 to 9), as follows in the present embodiment, are obtained in step S1102.
content (1)=4 cm×4 cm
content (2)=6 cm×4 cm
content (3)=5 cm×4 cm
content (4)=5 cm×5 cm
content (5)=3 cm×3 cm
content (6)=4 cm×5 cm
content (7)=5 cm×3 cm
content (8)=3 cm×4 cm
content (9)=4 cm×3 cm Numeral 1602 denotes sheet space in A4 size.

When these contents are inserted, in step S1103, the total area of the inserted contents and the area of the sheet space are measured. In the case of the above-described contents, the area of the sheet space is about 623 $cm^2$, and the total area of the contents is 153 $cm^2$.

In step S1104, to obtain virtual containers where the total area of the contents is smaller than the area of the sheet space and the entire area of all the contents is equal to the area of the sheet space, the enlargement ratio is obtained. Then containers in size quadruple of the contents are applied to the virtual sheet space based on the enlargement ratio, from the following expression.

sheet space area÷total area of contents
(623÷153)=4.07 . . . approximately quadruple FIG. 17 shows another example of the container arrangement for the quadruple-enlarged respective contents with the 110% of the sheet width as a threshold value. Numeral 1701 denotes a container in a size quadruple of the content, and 1702, virtual sheet space with 110% width of the sheet width as a threshold value.

Numeral 1703 denotes a circumscribed rectangle obtained in step S1106 after the container arrangement. The circumscribed rectangle 1703 has a length of 40 cm and a width of 22 cm, and the following aspect ratio.

40/22≅1.818

However, since it is determined in step S1107 that the aspect ratio is greater than the prescribed size shown in FIG. 15, the process proceeds to step S1108, at which containers in a size triple of the contents are generated, and rearranged.

FIG. 18 shows an arrangement of containers in a size triple of the contents on virtual sheet space with a 110% of the sheet width. Numeral 1801 denotes a container in a size triple of the content, and 1802, virtual sheet space with a 110% of the sheet width as a threshold value.

Numeral 1803 denotes a circumscribed rectangle obtained in step S1106 after the container arrangement. The circumscribed rectangle 1803 has a length of 267.8 cm and a width of 225.9 cm, and the following aspect ratio.

267.8/225.9≅1.225

Accordingly, the aspect ratio is included in the prescribed size, and the arrangement is a basic arrangement for generation of temporary template.

[Correction of Container Arrangement]

Next, correction of the arranged containers performed in steps S1109 and S1115 shown in FIGS. 11A and 11B will be described using FIG. 19.

Figure 19:
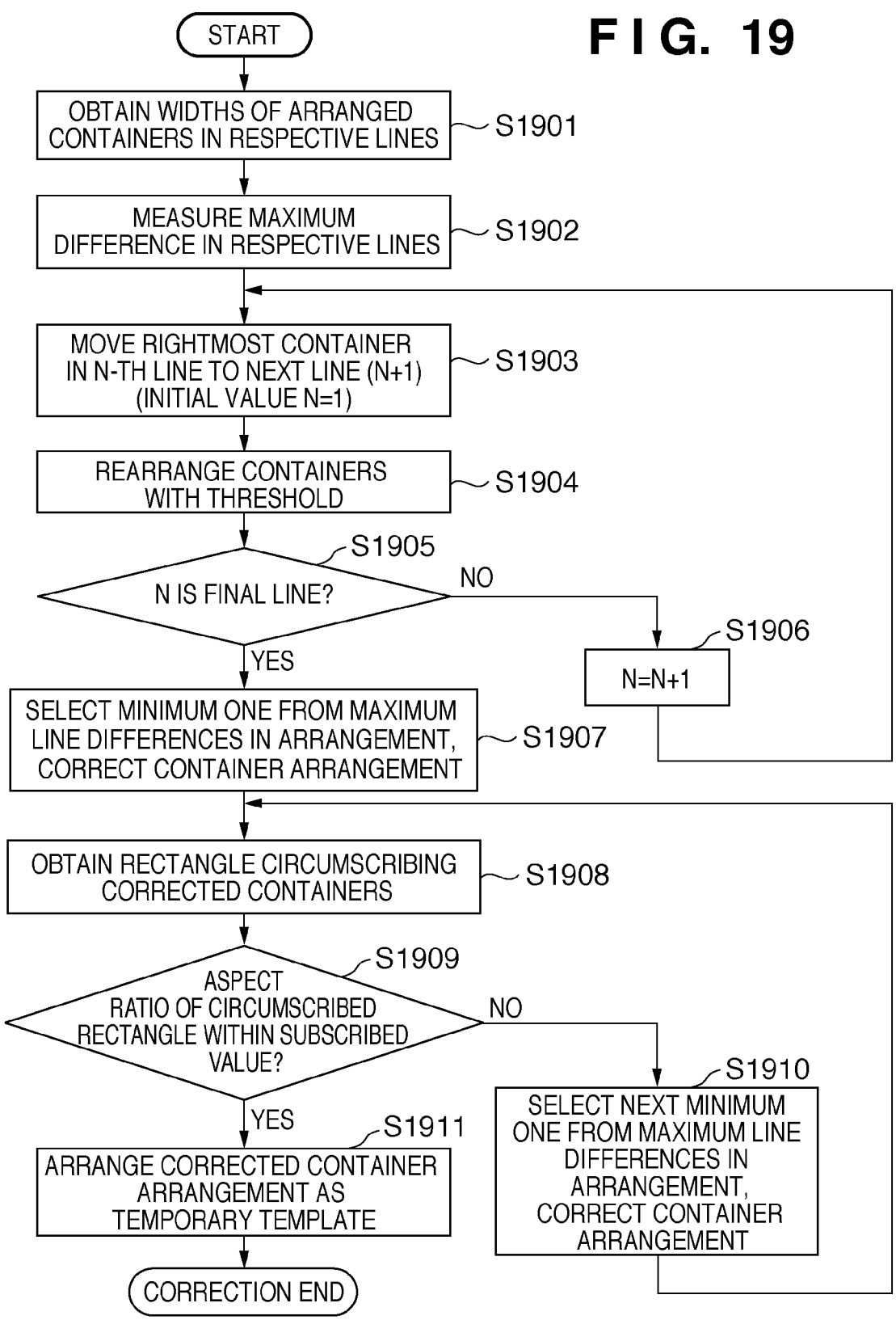
FIG. 19 is a flowchart showing arranged container correction processing.

FIG. 19 is a flowchart showing arranged container correction processing. In this example, after the arrangement of the containers, in the arrangement denoted by numeral 2001 (pattern 1) shown in FIG. 20, step S1901 is started. In step S1901, a total value of the container widths arranged in the respective lines is obtained, then in step S1902, a maximum difference among the respective containers is measured. For example, when the containers are arranged as the arrangement 2001 (pattern 1), the width of the first line is 21 cm as a total value of the widths of the containers 1 to 3. Similarly, the width of the second line is 22.5 cm, and the width of the third line is 10.5 cm. From the measurement, the maximum difference 2002 is 12 cm between the second line and the third line.

Figure 20:
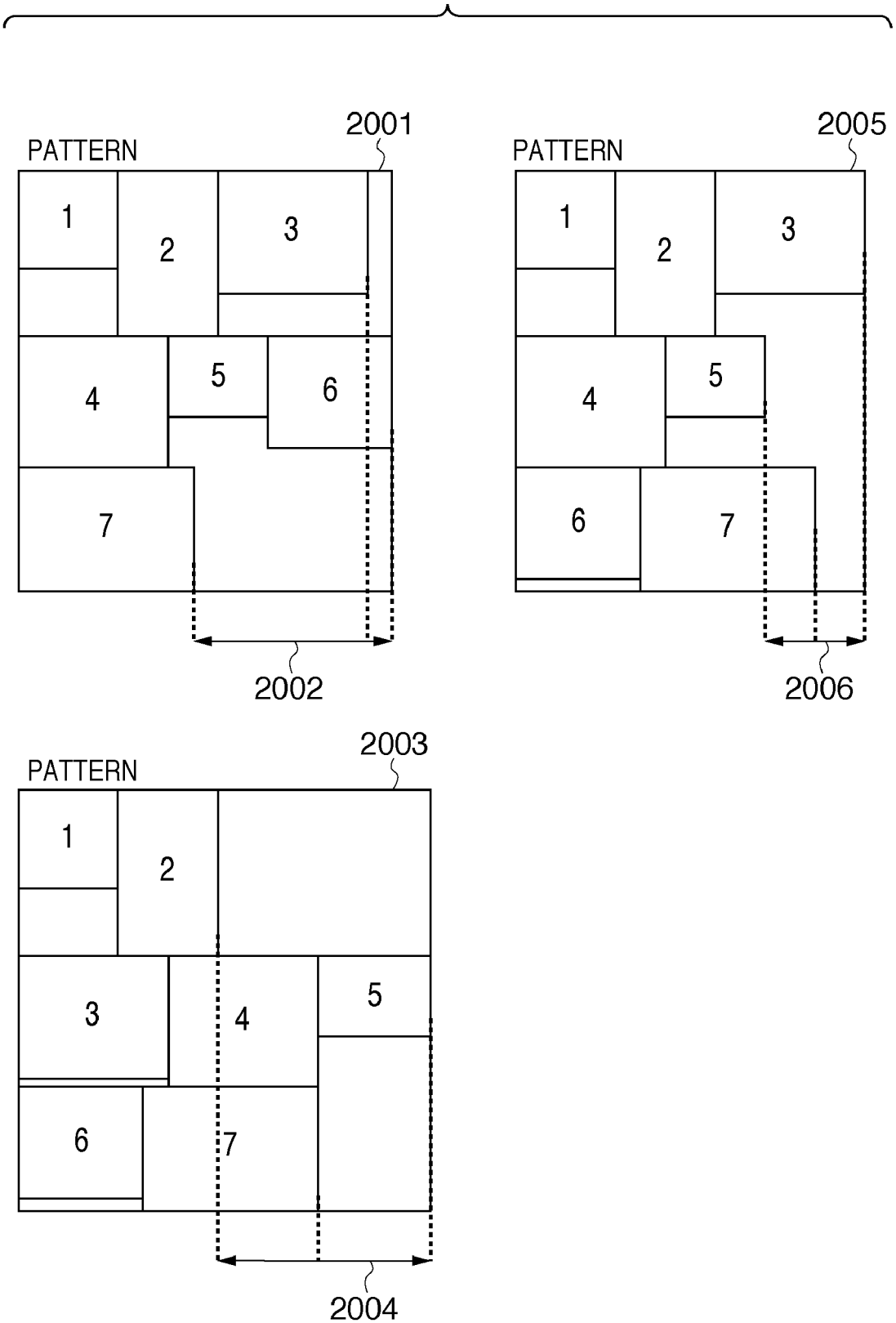
FIG. 20 is an explanatory view of the arranged container correction processing.

Next, to perform correction of the containers (rearrangement), in step S1903, a container in the rightmost position in the n-th line is moved to the next line. FIG. 20 shows an arrangement 2003 (pattern 2) where N=1 (initial value) holds, that is, a container in the rightmost position in the first line is moved and rearrangement has been performed.

Then in step S1904, the widths of the containers arranged in the respective lines are obtained as in the case of step S1901, and a maximum difference among the respective containers is measured. In the case of the arrangement 2003 (pattern 2), the width of the first line is 12 cm, the width of the second line, 24 cm, and the width of the third line, 18 cm. From the measurement, the maximum difference 2004 is 12 cm between the first line and the second line.

Next, in step S1905, it is determined whether or not the line from which the container moved from the rightmost position is a final line. In the case of FIG. 20, when N=1 holds, as the line is not a final line, the process proceeds to step S1906, at which N=2 holds, and the process returns to step S1903.

When N=2 holds, FIG. 20 shows an arrangement 2005 (pattern 3) where the container in the rightmost position in the second line is moved and rearrangement is performed. When this arrangement is processed as in the case of the above-described processing, the width of the first line is 21 cm, the width of the second line, 15 cm, and the width of the third line, 18 cm. From the measurement, the maximum difference 2006 is 6 cm between the first line and the second line.

Next, when N=3 holds, as only one container is positioned in the third line, even rearrangement is performed, the arrangement is similar to the arrangement 2001.

In step S1905, when the N-th line is a final line, the process proceeds to step S1907, at which a minimum one of the maximum differences 2002, 2004 and 2006 after the rearrangement up to the final line is selected, and the container arrangement is corrected. That is, in the example in FIG. 20, the pattern 3 is selected.

Next, in step S1908, a rectangle circumscribing the corrected containers is obtained. In this example, as the maximum difference 2006 is the minimum, a circumscribed rectangle in an arrangement like the arrangement 2005 (pattern 3) is obtained.

Next, in step S1909, it is determined whether or not the aspect ratio of the obtained circumscribed rectangle is within the prescribed value. When it is determined that the aspect ratio is without the prescribed value, the process proceeds to step S1910, at which the next minimum one to the maximum difference selected in step S1907 is selected, and the process returns to step S1908. Further, when it is determined that the aspect ratio is within the prescribed value, the process proceeds to step S1911, at which the arrangement pattern of the temporary plate is corrected, and the process ends.

In the present embodiment, as the circumscribed rectangle in the arrangement like the arrangement 2005 is within the prescribed value, the arrangement is corrected as a temporary template arrangement pattern, and the process ends.

[Correction of Temporary Template]

Next, as template correction, processing regarding priority assignment to the arranged containers will be described using FIGS. 21 to 23.

Figure 21:
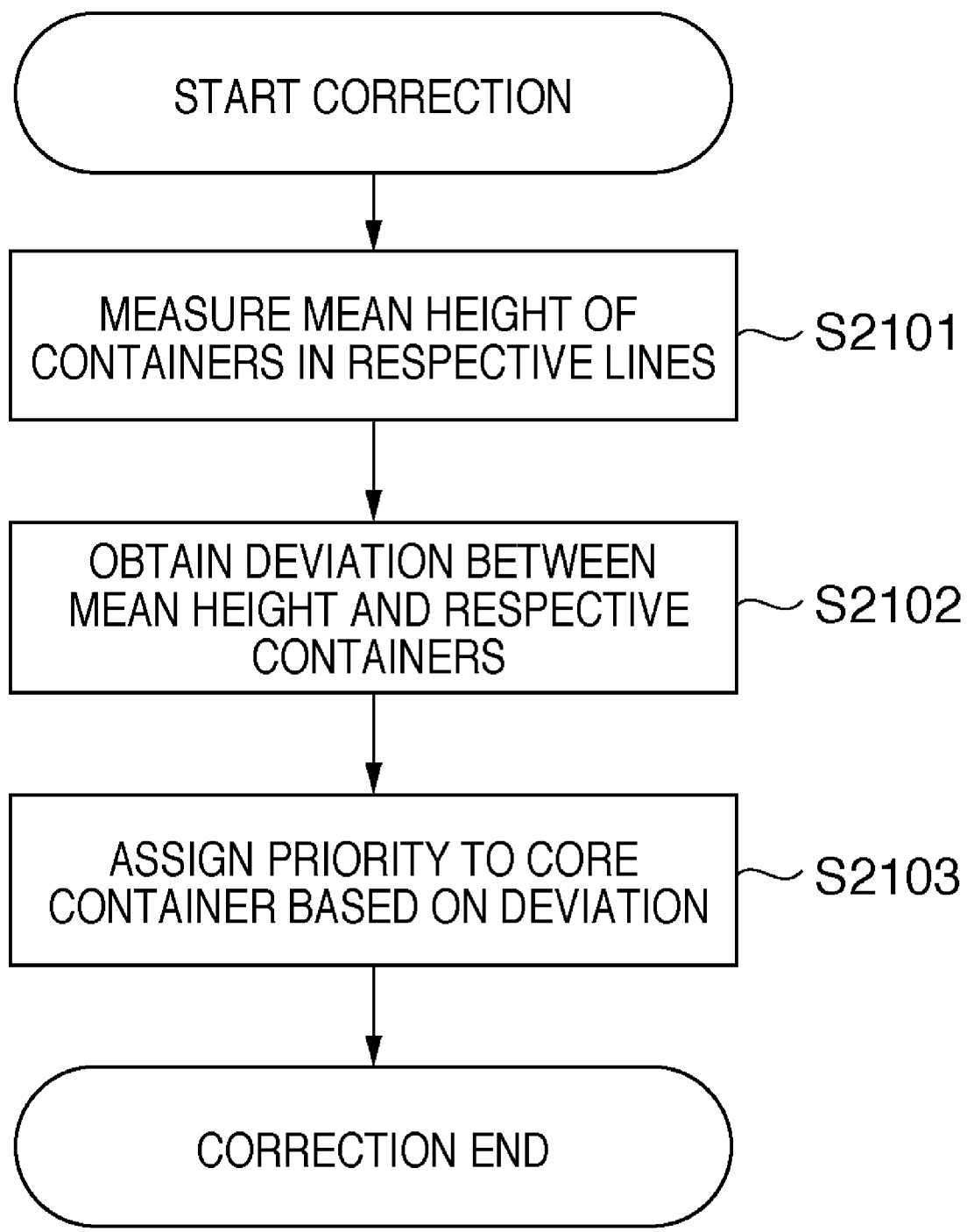
FIG. 21 is a flowchart showing processing in step S1116 shown in FIG. 11B.

FIG. 21 is a flowchart showing the processing in step S1116 shown in FIG. 11B. In step S2101, a mean height of the containers in the respective lines is obtained. Next, in step S2102, deviations between the mean height obtained in step S2101 and the respective containers are obtained. Then in step S2103, based on the deviations obtained in step S2102, priorities are assigned to the respective containers, and the process ends.

Figure 22:
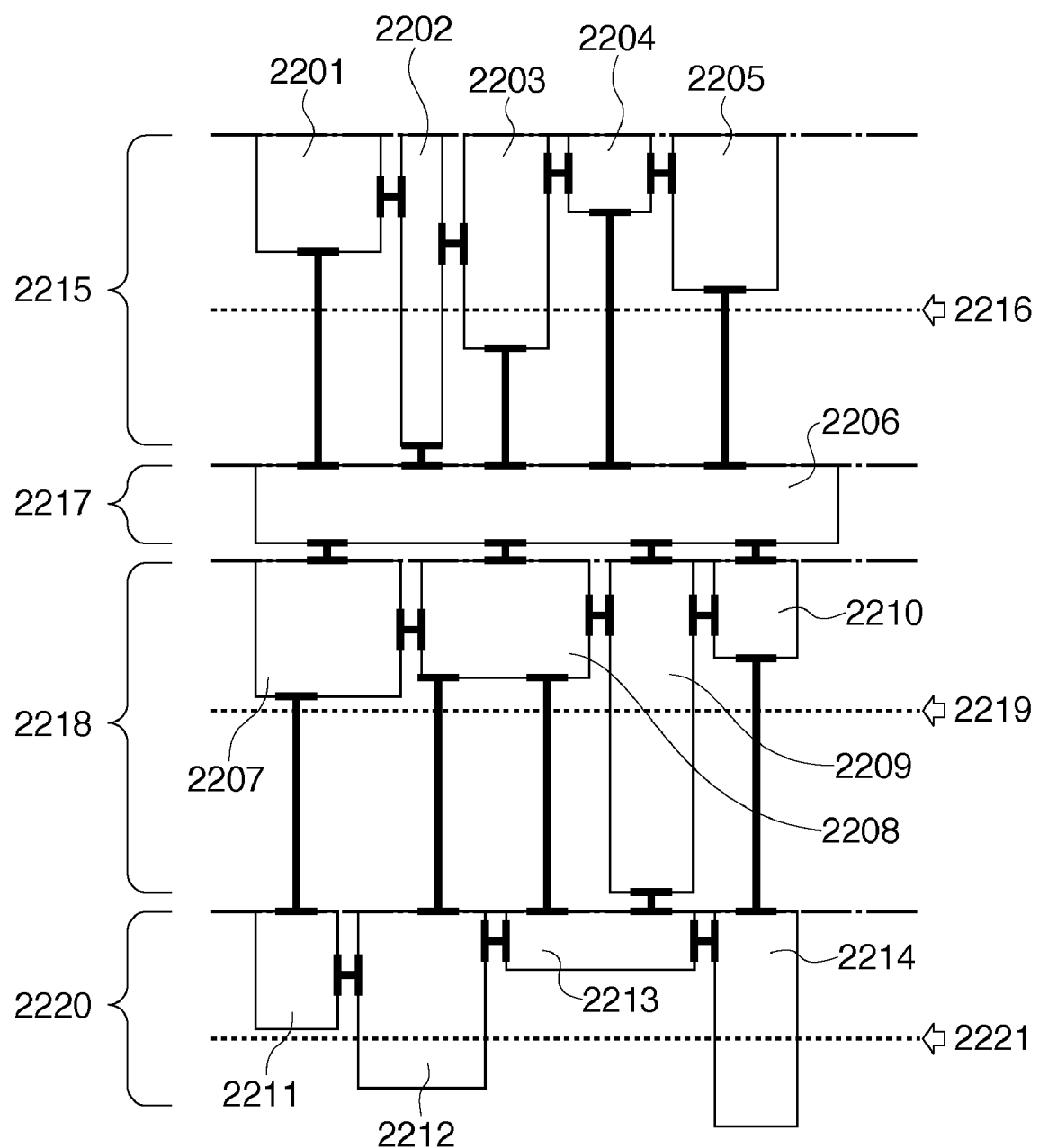
FIG. 22 illustrates a status before temporary template correction processing.
Figure 23:
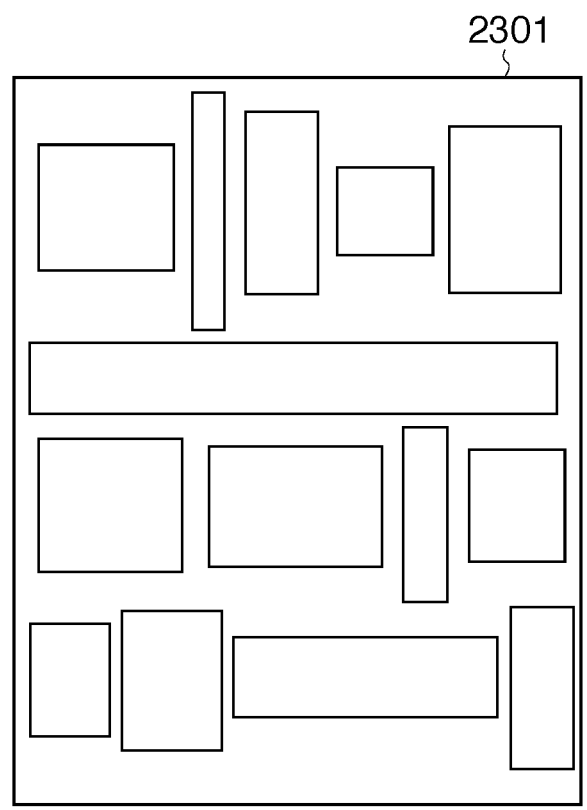
FIG. 23 illustrates a status of a temporary template corrected based on priority assignment.

FIG. 22 shows a status before the temporary template correction processing. FIG. 23 illustrates a status of the temporary template corrected based on priority assignment. In this example, priorities which are not accurate but approximate are assigned.

In FIG. 22, containers 2201 to 2214 are arranged as a temporary template. The vertical and horizontal sides of the respective containers are connected with connectors. The containers 2201 to 2205 belong to a line 2215, and the container 2206, to a line 2217. Further, the containers 2207 to 2210 belong to a line 2218, and the containers 2211 to 2214, to a line 2220. Note that the positions of the upper sides of the containers belonging to the respective lines are unified.

A mean value 2216 is a mean height of the containers included in the line 2215 positioned in heights of respective containers (6+16+11+4+8) ÷number of containers (5)=9.

Further, a mean value 2219 is a mean height of the containers included in the line 2218 positioned in heights of respective containers (7+6+17+5)÷number of containers (4)=8.75.

Further, a mean value 2221 is a mean height of the containers included in the line 2220 positioned in heights of respective containers (6+9+3+11)÷number of containers (4)=4.75.

Next, the priority assignment processing shown in FIG. 21 will be described with reference to the line 2215 as an example. The mean value 2216 is "9", and the deviations from the respective containers are as follows.

container 2201:3
container 2202:7
container 2203:2
container 2204:5
container 2205:1

As described above, the maximum deviation is 7, and with this value as a reference, priorities are assigned to the respective containers. Note that for the sake of simplification of the explanation, assuming that the priorities are in five levels (high:0 to 4:low), priorities proportional to the deviations are set as follows.

deviation 0→priority 0
deviation 0 to 1→priority 1
deviation 1 to 3→priority 2
deviation 3 to 5→priority 3
deviation 5 to 7→priority 4

Accordingly, the priorities of the above-described respective containers are set as follows.

container 2201:priority 2
container 2202:priority 4
container 2203:priority 2
container 2204:priority 3
container 2205:priority 1

The change amounts of the respective containers are determined based on the above-described priorities. For example, in FIG. 22, the container 2205 having the priority 1 becomes the mean value 2216 by increasing the container size by 1. Accordingly, the change amount of the container 2205 is +1. On the other hand, as the priorities of the containers 2201 and 2203 are 2, the change amount is double of the change amount of the priority 1. That is, the change amounts of the containers 2201 and 2203 are +2.

Further, as the container 2202 has the priority 4, the change amount is quadruple of the change amount of the priority 1. Note that as the container 2202 is larger than the mean value 2216, the change amount is changed so as to be decreased. That is, the change amount of the container 2202 is −4. FIG. 23 shows the result of repetition of the above processing. By this processing, as shown in FIG. 23, a layout template where containers in averaged sizes are arranged can be generated.

Figure 24:
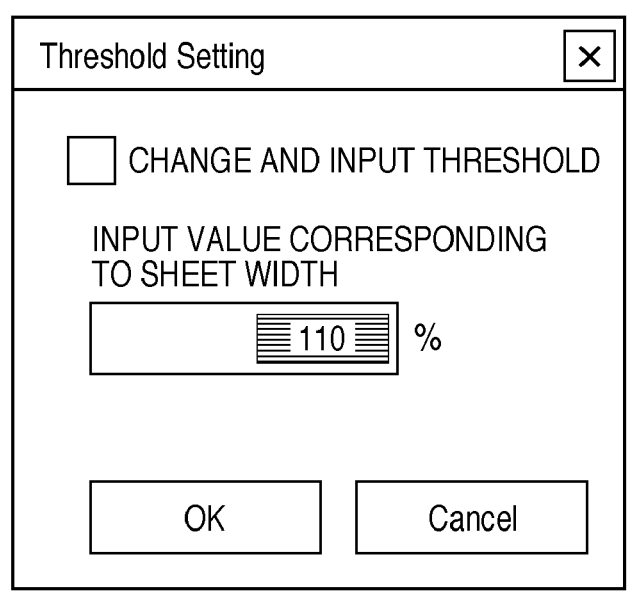
FIG. 24 is an example of a UI for setting a threshold value used upon container arrangement in step S1105 shown in FIG. 11A.

FIG. 24 is an example of an UI screen for setting a threshold value used upon container arrangement in step S1105 shown in FIG. 11A. As shown in FIG. 24, the threshold value setting may be freely changed by the user in addition to the set threshold value (110%).

According to the present embodiment, when a source material is generated by extracting necessary parts from various data sources and designating necessary contents, it is possible to effectively utilize page space and to pack the contents without time and trouble by easily viewable automatic layout processing.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-291501, filed Nov. 13, 2008, which is hereby incorporated by reference herein in its entirety.

What is claimed is:

1. A layout editing apparatus 'including a computer processor' for laying out a plurality of contents comprising:
   a comparing unit that compares a total size of the plurality of contents with a size of a processing area where the plurality of contents is arranged;
   a generation unit that, in a case where the total size is smaller than the size of the processing area, generates a plurality of containers, to lay out the plurality of contents, enlarged according to an enlargement ratio set based on the total size and the size of the processing area;
   an arrangement unit that arranges the plurality of containers within a prescribed width of the processing area;
   a determination unit that determines whether or not an aspect ratio of a result of arrangement fulfills predetermined conditions; and
   a template generation unit that, in a case where it is determined by the determination unit that the aspect ratio fulfills the predetermined conditions, generates a template including the plurality of containers arranged by the arrangement unit, and
   wherein, in a case where it is determined by the determination unit that the aspect ratio does not fulfill the predetermined conditions, the arrangement unit arranges a plurality of containers using a reduced enlargement ratio.

2. The apparatus according to claim 1, wherein the arrangement unit arranges the respective containers so as to reduce a difference among widths of the respective containers to be arranged in respective lines to a minimum value.

3. The apparatus according to claim 1, wherein the arrangement unit assigns priorities to the respective containers in correspondence with deviations among heights of the respective containers in the respective lines, and arranges the respective containers based on the priorities.

4. The apparatus according to claim 1, wherein the arranged plurality of containers are automatically connected with connectors, and the connectors hold an ideal size.

5. The apparatus according to claim 4, wherein the template generation unit generates a template where the containers and the connectors are reduced.

6. A layout editing method for a layout editing apparatus for laying out a plurality of contents, comprising:
   comparing a total size of the plurality of contents with a size of a processing area where the plurality of contents is arranged;
   generating, in a case where the total size is smaller than the size of the processing area, a plurality of containers, to lay out the plurality of contents, enlarged according to an enlargement ratio based on the total size and the size of the processing area;
   arranging the generated plurality of containers, for the plurality of contents, so as to be included in a predetermined area, within a prescribed width of the processing area; and
   determining whether or not an aspect ratio of a result of arrangement fulfills predetermined conditions; and
   generating, in a case where it is determined in the determining step that the aspect ratio fulfills the predetermined conditions, a template including the plurality of containers arranged in the arranging step; and
   wherein, in a case where it is determined in the determining step that the aspect ratio does not fulfill the predetermined conditions, the arranging step arranges a plurality of containers using a reduced enlargement ratio.

7. A computer-readable recording medium holding a program to perform the layout editing method in claim 6 by a computer.

* * * * *